US012319589B2

United States Patent
Chemnitz et al.

(10) Patent No.: US 12,319,589 B2
(45) Date of Patent: Jun. 3, 2025

(54) PREPARATION OF METAL FLUORIDES AND SEPARATION PROCESSES

(71) Applicants: TECHNISCHE UNIVERSITÄT MÜNCHEN, Munich (DE); PHILIPPS-UNIVERSITÄT MARBURG, Marburg (DE)

(72) Inventors: Tobias Chemnitz, Garching (DE); Florian Kraus, Penzing (DE); Winfried Petry, Baldham (DE); Christian Steyer, Garching (DE); Stefan Rudel, Marburg (DE); Riane Stene, Marburg (DE)

(73) Assignees: Technische Universitaet München, Munich (DE); Philipps-Universitat Marburg, Marburg (DE)

(*) Notice: Subject to any disclaimer, the term of this patent is extended or adjusted under 35 U.S.C. 154(b) by 876 days.

(21) Appl. No.: 17/440,904

(22) PCT Filed: Mar. 19, 2020

(86) PCT No.: PCT/EP2020/057662
§ 371 (c)(1),
(2) Date: Sep. 20, 2021

(87) PCT Pub. No.: WO2020/188048
PCT Pub. Date: Sep. 24, 2020

(65) Prior Publication Data
US 2022/0153607 A1     May 19, 2022

(30) Foreign Application Priority Data
Mar. 21, 2019   (EP) .................... 19164391

(51) Int. Cl.
| *C01G 43/06* | (2006.01) |
| *B01D 7/00* | (2006.01) |
| *B01J 3/00* | (2006.01) |
| *C01G 39/04* | (2006.01) |
| *G21G 1/00* | (2006.01) |
| *G21G 4/04* | (2006.01) |

(52) U.S. Cl.
CPC .............. *C01G 43/06* (2013.01); *B01D 7/00* (2013.01); *B01J 3/008* (2013.01); *C01G 39/04* (2013.01); *G21G 1/001* (2013.01); *G21G 4/04* (2013.01); *G21G 2001/0094* (2013.01)

(58) Field of Classification Search
CPC .......... C01G 43/06; C01G 39/04; B01J 3/008; B01D 7/00; G21G 1/001; G21G 4/04
See application file for complete search history.

(56) References Cited

U.S. PATENT DOCUMENTS

| 5,723,837 | A | 3/1998 | Jeapes et al. |
| 2006/0057043 | A1 | 3/2006 | Amamoto et al. |

FOREIGN PATENT DOCUMENTS

| EP | 0556135 | A1 | 8/1993 | |
| RU | 2131846 | C1 | 6/1999 | |
| RU | 2221749 | C2 | 1/2004 | |
| RU | 2326052 | C2 | 6/2008 | |
| WO | WO-9738785 | A1 * | 10/1997 | ............ B01D 59/34 |
| WO | 20100014745 | A1 | 2/2010 | |

OTHER PUBLICATIONS

English Translation of Russian Search Report for Russian Counterpart Application No. 2021130304, mailed Aug. 28, 2023 (6 pages).
International Search Report for International Application No. PCT/EP2020/057662, mailed Sep. 9, 2020 (12 pages).
E-Space net English Abstract for EP 0556135 A1.

\* cited by examiner

*Primary Examiner* — Long L Chu
(74) *Attorney, Agent, or Firm* — Kagan Binder, PLLC

(57) ABSTRACT

Provided is a process which allows uranium and molybdenum fluorides to be efficiently separated, said process comprising a step of providing a mixture containing $MoF_6$ and $UF_6$; a step of reducing the $UF_6$ to $UF_5$ in the gas phase or in a liquid phase; and a step of separating the $UF_5$ and the $MoF_6$ or a conversion product thereof which may be obtained by further converting the molybdenum fluoride to another molybdenum compound. In a further aspect, a process for the fluorination of metals or semimetals is provided.

19 Claims, 1 Drawing Sheet

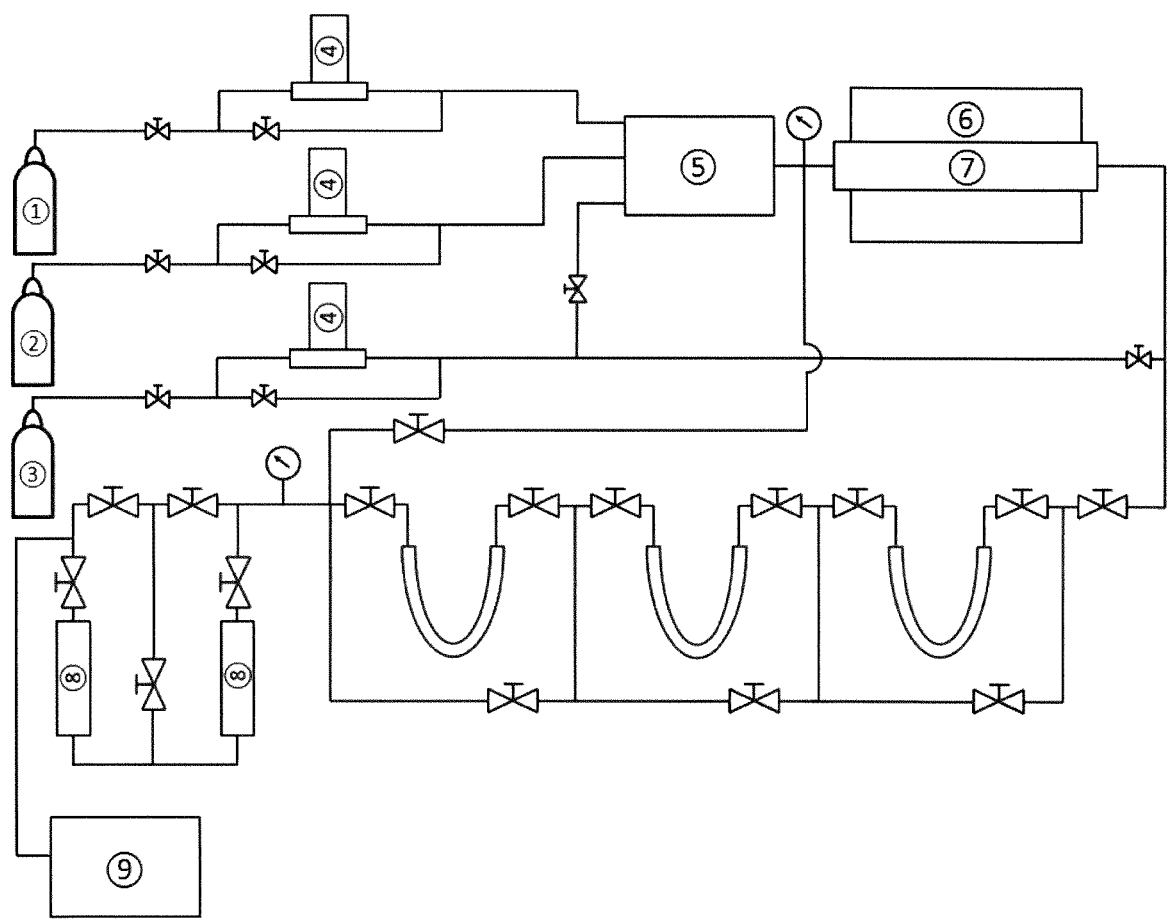

PREPARATION OF METAL FLUORIDES AND SEPARATION PROCESSES

CROSS-REFERENCE TO RELATED APPLICATIONS

This application claims priority to International Application No. PCT/EP2020/057662, filed Mar. 19, 2020 and titled "PREPARATION OF METAL FLUORIDES AND SEPARATION PROCESSES," which in turn claims priority from a European Patent Application having Ser. No. 19/164, 391.5, filed Mar. 21, 2019, titled "PREPARATION OF METAL FLUORIDES AND SEPARATION PROCESSES," both of which are incorporated herein by reference in their entireties.

The present invention relates to processes for the preparation of metal fluorides, and to processes for the separation or the purification of metals and metal compounds making use of the metal fluorides.

Nuclear medicine plays an important role in modern diagnostic and therapeutic strategies. A widely used isotope for imaging purposes is technetium-99m (Tc-99m). It is used, typically after being combined with a targeting entity in a pharmaceutical compound, e.g. for the examination of the thyroid gland, lung, heart, liver, gallbladder or the skeleton. Tc-99m is obtained as a result of a β-decay from its parent nuclide molybdenum-99 (Mo-99), which, in turn, is predominantly generated by the fission of uranium-235 (U-235) targets (Technische Universität München, Forschungs-Neutronenquelle Heinz Meier-Leibnitz; www.frm2.turn.de). As an alternative approach for the generation of Mo-99, U.S. Pat. No. 8,126,104 B2 discloses the alpha particle irradiation of zirconium-96.

Due to the limited half-life of Mo-99 of 66 hours, the uranium targets used for the provision of the molybdenum isotope are subjected to a purification process immediately after irradiation, so as to allow a separation of Mo-99 from the remaining uranium and from other fission products. This process typically involves the dissolution of the target using an alkali or diluted nitric acid and is capable of providing large quantities of molybdate with a high specific activity. However, high volumes of acidic liquid radioactive waste are produced as undesirable side product. Thus, a process would be desirable which allows a rapid separation of molybdenum or its compounds from uranium, and which allows the amounts of radioactive waste to be reduced compared to established wet chemical procedures.

Moreover, uranium-molybdenum alloys are being developed as fuels (U-Mo fuel) in high flux neutron sources (research and test reactors). In the preparation of such fuels, the separation of U and Mo, e.g. to allow the recycling of unspent uranium enriched in uranium-235, is of interest.

In the context of the present invention, it was found that uranium and molybdenum can be efficiently separated via processing of their metal fluorides as intermediates. Moreover, the inventors developed a convenient process for the preparation of these metal fluorides.

Thus, the invention provides a process comprising
a step of providing a mixture containing $MoF_6$ and $UF_6$;
a step of reducing the $UF_6$ to $UF_5$; and
a step of separating the $UF_5$ and the $MoF_6$ or a conversion product thereof which may be obtained by further converting the molybdenum fluoride to another molybdenum compound.

A first preferred aspect of the invention is a process which comprises a step of providing a mixture containing $MoF_6$ and $UF_6$ as an initial metal fluoride mixture;

a dissolution step, which comprises dissolving $MoF_6$ and $UF_6$ in a liquid phase or a supercritical fluid phase to obtain a solution containing both $MoF_6$ and $UF_6$ in dissolved form;

a precipitation step, which comprises reducing the $UF_6$ contained in the solution to $UF_5$ and allowing it to precipitate from the solution; and a separation step, which comprises
(i) separating the precipitated $UF_5$ from the solution; or
(ii) removing the liquid phase or supercritical fluid phase of the solution in the presence of the precipitated $UF_5$ to obtain a solid phase containing the precipitated $UF_5$ and molybdenum fluoride, and separating the $UF_5$ and the molybdenum fluoride or a conversion product thereof which may be obtained by further converting the molybdenum fluoride to another molybdenum compound.

In accordance with a second preferred aspect, the invention provides a process comprising
a step of providing a gas phase mixture containing $MoF_6$, $UF_6$ and a fluorine atom scavenger mixed in gaseous form;
a step of irradiating the $UF_6$ in the gas phase mixture in the presence of the fluorine atom scavenger with light having a wavelength in the range of 340 to 410 nm to reduce the $UF_6$ to $UF_5$ and to obtain a mixture comprising $UF_5$ and $MoF_6$; and
a step of separating the $UF_5$ and the $MoF_6$.

Furthermore, the invention relates to a process for the provision of a metal fluoride, said process comprising the steps of:
providing fluorine radicals from a fluorine containing precursor compound using a plasma source;
reacting the fluorine radicals with a solid material containing an elemental metal to obtain a metal fluoride or with a solid material containing an elemental semimetal to obtain a semimetal fluoride; and
recovering the metal fluoride or semimetal fluoride;
wherein the metal is selected from molybdenum, technetium, ruthenium, rhodium, palladium, tungsten, rhenium, osmium, iridium, platinum, gold and uranium, and the semimetal is tellurium. This process is also referred to herein as the "metal fluoride production process" of the invention.

In the following, the process in accordance with the preferred first aspect of the invention as set forth above will be discussed. The process can be suitably used e.g. to obtain molybdenum or a molybdenum compound, in particular to obtain molybdenum or a molybdenum compound containing the isotope molybdenum-99. Alternatively or concurrently, it can be used to obtain uranium or a uranium compound, in particular to obtain uranium or a uranium compound enriched in uranium-235.

The process in accordance with the first aspect comprises a step of providing a mixture containing $MoF_6$ and $UF_6$ as an initial metal fluoride mixture.

The process can be applied to mixtures containing molar ratios of $MoF_6$ and $UF_6$ varying over wide ranges, e.g. from 1:400 to 100:1. Preferably the molar ratios are in the range of 1:5 to 10:1.

As will be understood from the above, the uranium contained in the $UF_6$ may be uranium enriched in uranium-235. The molybdenum contained in the $MoF_6$ may contain molybdenum-99.

The step of providing a mixture containing $MoF_6$ and $UF_6$ as an initial metal fluoride mixture preferably comprises reacting a solid material which contains elemental uranium and elemental molybdenum with fluorine radicals to obtain the mixture containing $MoF_6$ and $UF_6$. The reaction comprises exposing the solid material to a gas flow comprising the fluorine radicals.

Also the uranium contained in the solid material may be uranium enriched in uranium-235. The molybdenum contained in the solid material may contain molybdenum-99.

The weight ratio of elemental uranium and elemental molybdenum in the solid material is not particularly limited with a view to the separation of the two elements via their fluorides. Typical contents of molybdenum range from 0.01 to 12 wt %, based on the total weight of uranium and molybdenum as 100 wt %.

In the case of a solid material comprising the isotope molybdenum-99 which is reacted with fluorine radicals, preferred contents of elemental molybdenum are in the range of 0.02 to 1.0 wt %, more preferably 0.05 to 0.2 wt %, based on the total weight of elemental uranium and elemental molybdenum as 100 wt %.

In the case of a solid material containing uranium and molybdenum which can be used in the preparation of an U-Mo fuel, and which can also be reacted with fluorine radicals to obtain the mixture containing $MoF_6$ and $UF_6$, preferred contents of elemental molybdenum are in the range of 5 to 12 wt %, more preferably 7 to 10 wt %, based on the total weight of elemental uranium and elemental molybdenum as 100 wt %.

In addition to U and Mo, the solid material which is reacted with fluorine radicals may contain other components, including other metals, or it may be free of other metals apart from uranium and molybdenum. For example, aluminum may be present as a matrix material in combination with uranium in uranium targets which are irradiated with neutrons to convert uranium into molybdenum-99.

The total content of elemental uranium and elemental molybdenum in the solid material which is reacted with fluorine radicals is preferably in the range of 30-100 wt %, more preferably 50-100 wt %. In this context, the weight percentage is based on the total mass of the material which comprises the uranium and the molybdenum as 100 wt %, excluding the mass of any cladding which may be applied to the material which comprises the uranium and the molybdenum. As will be understood by the skilled person, the material which comprises the uranium and the molybdenum, and which is also referred to as "meat" may be provided as a dispersed phase, wherein uranium and molybdenum are dispersed in a matrix material such as aluminum, or as a homogeneous or monolithic phase.

In the case of a solid material comprising the isotope molybdenum-99 which is reacted with fluorine radicals, preferred total contents of elemental uranium and elemental molybdenum are in the range of 30-100 wt %, more preferably 50-100 wt %, based on the total mass of the meat excluding any cladding.

In the case of a solid material containing uranium and molybdenum which is used in the preparation of an U-Mo fuel, and which can also be reacted with fluorine radicals to obtain the mixture containing $MoF_6$ and $UF_6$, preferred total contents of elemental uranium and elemental molybdenum are also in the range of 30-100 wt %, more preferably 50-100 wt %, based on the total mass of the meat excluding any cladding.

In the solid material containing elemental uranium and elemental molybdenum, the two elements may be combined e.g. in the form of a mixture, or in the form of an alloy. Since, as noted above, further components apart from uranium and molybdenum may be present in the solid material, it is also possible that the uranium, the molybdenum, or both, form an alloy with one or more of such other components. It is noted that the reference to an alloy herein encompasses intermetallic phases, to the extent that such a phase is formed by the components of the alloy under consideration. Reference to an alloy also encompasses an alloy formed from one or more metals, such as uranium, and one or more semimetals, such as silicon. As a preferred example of a solid material containing elemental uranium and elemental molybdenum, reference can further be made to a solid material containing uranium or an uranium alloy (e.g. uranium silicide) wherein molybdenum has been formed via irradiation with neutrons and is dispersed in the uranium or the uranium alloy.

The form in which the solid material is subjected to a reaction with the fluorine radicals is not particularly limited. The solid material may have a compact shape, e.g. a regular compact shape such as a plate, a cylinder or a sphere. The solid material may also be reacted with the fluorine radicals in the form of a powder. For example, in certain applications, uranium and molybdenum may be encapsulated by another metal or dispersed in a matrix of another metal, so that it may be useful to subject such an encapsulated or dispersed starting material to a mechanical disintegration to provide a powder which can be advantageously used as a solid material for the reaction with fluorine radicals.

The solid material which is reacted with the fluorine radicals as a preferred embodiment of the process in accordance with the first aspect of the invention may be provided, e.g., by irradiating a solid material which contains elemental uranium enriched in the isotope uranium-235 with neutrons. Thus, a solid material comprising elemental uranium and elemental molybdenum is provided wherein the elemental molybdenum comprises the isotope molybdenum-99. In other words, the step of providing a mixture containing $MoF_6$ and $UF_6$ as an initial metal fluoride mixture may comprise irradiating a solid material which contains elemental uranium enriched in the isotope uranium-235 with neutrons to obtain a solid material comprising elemental uranium and elemental molybdenum, and wherein the elemental molybdenum comprises the isotope molybdenum-99. Established procedures for generating molybdenum-99 by the fission of uranium-235 via irradiation with neutrons can be relied on in this regard.

Alternatively, the solid material which is reacted with the fluorine radicals as a preferred embodiment of the process in accordance with the first aspect of the invention may be provided by preparing an alloy comprising elemental uranium enriched in the isotope uranium-235 and non-radioactive molybdenum. Thus, a solid material comprising elemental uranium enriched in uranium-235 and molybdenum is obtained, which may be used e.g. as a U-Mo fuel.

As referred to herein, uranium enriched in the isotope uranium-235 typically contains the uranium-235 in an amount of up to 50 wt % (based on the total weight of uranium as 100 wt %.

The step of providing a mixture containing $MoF_6$ and $UF_6$ as an initial metal fluoride mixture may further comprise, prior to the reaction of the solid material with fluorine radicals, a reaction of the solid material with hydrogen radicals to obtain a solid material comprising $UH_3$; and the reconversion of $UH_3$ to elemental uranium by subjecting the $UH_3$ to an increased temperature. This reaction with hydrogen radicals may be particularly advantageous for a solid material obtained by irradiating a solid material which contains elemental uranium enriched in the isotope uranium-235 with neutrons.

If, in accordance with the preferred embodiment discussed above, the solid material comprising elemental uranium and elemental molybdenum is obtained by irradiating a solid material which contains elemental uranium enriched in the isotope uranium-235 with neutrons, the solid material may be reacted with hydrogen radicals to fully or partially convert the uranium to $UH_3$. Accordingly, the reaction with hydrogen radicals would be carried out prior to the reaction with fluorine radicals. The molybdenum contained in the solid material does not react with hydrogen. Such a preliminary reaction with hydrogen radicals to form $UH_3$ may be useful, e.g., to fully or partially disintegrate the metal matrix of a solid material comprising uranium which has been irradiated with neutrons, and wherein gaseous side products, in particular Kr and Xe, may be formed during the irradiation. Such gaseous side products can be conveniently set free and be removed after the conversion to $UH_3$. Also prior to the reaction of the solid material with fluorine radicals, the $UH_3$ would be reconverted to elemental uranium. This can be accomplished, e.g., subjecting the $UH_3$ to an increased temperature, typically under a vacuum or in an inert atmosphere. The temperature is preferably in the range of 250° C. and 500° C., more preferably at 350° C.

Prior to subjecting the solid material which contains elemental uranium and elemental molybdenum to a reaction with the fluorine radicals, its surface may be cleaned, if needed e.g. to remove metal oxides. This can be accomplished, for example, using a mineral acid such as nitric acid.

The fluorine radicals which are reacted with the solid material containing elemental uranium and elemental molybdenum in accordance with the above embodiment are preferably generated from a fluorine containing precursor compound in a plasma source, more preferably in a remote plasma source. Thus, the step of providing a mixture containing $MoF_6$ and $UF_6$ as an initial metal fluoride mixture preferably comprises generating fluorine radicals in a plasma source, more preferably in a remote plasma source.

In a plasma source, fluorine radicals are generated by supplying energy to a fluorine containing precursor compound so as to dissociate a bond formed with a fluorine atom in the precursor compound. Fluorine containing precursor compounds are typically gaseous compounds. Known precursor compounds, which can also be used in the context of the present invention, include for example any one of $F_2$, $NF_3$, $SF_6$ and $CF_4$. Among them, $F_2$ and $NF_3$ are preferred, and $NF_3$ is particularly preferred due to its reduced corrosivity and its reduced toxicity compared to $F_2$.

In the plasma source, the plasma can be generated e.g. using microwave radiation. Commercially available plasma sources may be used for this purpose. The radiation frequency can be suitably adjusted, e.g. depending on the fluorine containing precursor compound used, to achieve a high degree of dissociation.

The preferred use of a remote plasma source allows the reaction between the fluorine radicals and the solid material containing elemental uranium and elemental molybdenum to take place at a location which is remote from the actual plasma source. Thus, the control of the reaction is facilitated.

As noted above, the reaction of the solid material with fluorine radicals comprises exposing the solid material to a gas flow which comprises the fluorine radicals. The gas flow may further comprise a carrier gas. Typically, the carrier gas is a noble gas such as argon.

Typically, the gas flow which comprises the fluorine radicals is provided by directing a gas flow comprising a gaseous fluorine containing precursor compound and preferably a carrier gas such as argon into a plasma source, preferably a remote plasma source. The solid material containing elemental uranium and elemental molybdenum can then be exposed to the gas flow comprising the fluorine radicals generated by the plasma source, and preferably comprising the carrier gas. It will be understood that the gas flow to which the solid material is exposed may also comprise residual precursor compound.

Thus, the composition of the gas flow can be conveniently controlled by controlling the mass flow of a fluorine containing precursor compound and of the optional carrier gas into the plasma source. Typically, volume ratios of the fluorine containing precursor compound to the optional carrier gas are adjusted in the range of 10:1 to 1:10, preferably 2:1 to 1:2, more preferably 1:1.

For example, the mass flow of the fluorine containing precursor compound into the plasma source can be adjusted to values in the range of 10 to 50 sccm, preferably 15 to 35 sccm. The flow of the optional carrier gas can be adjusted accordingly, taking into account the above typical/preferred volume ratios. As will be understood by the skilled reader, the standardized volumes are indicated on the basis of a temperature of 0° C. and a pressure of 1013.25 hPa.

If a carrier gas, in particular a noble gas such as argon is present in the gas flow, it is advantageous to generate the fluorine radicals in a plasma which burns in the direct environment of the substrate and thereby facilitate the reaction of the metals with the fluorine atoms.

The plasma may be ignited and maintained by commonly used methods such as direct current (DC), high frequency (HF) or microwave radiation, or by a combination of any of these methods. When a suitable substrate potential with respect to plasma and floating potential is additionally applied to the solid material to be reacted with the fluorine radicals, plasma species are accelerated to the surface of the solid material. Thus, electrons allow the localized and directed heating of the solid material, whereas the ion bombardment leads to an ejection of the atoms of the solid material, which can additionally enhance the reaction with the fluorine radicals.

As will be understood by the skilled person, the fluorine radicals are typically provided and the reaction of the solid material with the fluorine radicals is typically carried out in a reaction system which can be evacuated and which is suitable for the introduction of a controlled gas flow at pressures below atmospheric pressure. An exemplary setup of a suitable reaction system is illustrated schematically in FIG. 1.

The pressure inside a reaction system wherein the reaction of the solid material with the fluorine radicals takes place can be controlled by the selected mass flow of the gases, preferably gases consisting of the fluorine gas containing precursor and optionally a carrier gas such as argon.

Typically, the pressure inside the reactor wherein the solid material which contains elemental uranium and elemental molybdenum is reacted with fluorine radicals is in the range of 10 Pa to 3000 Pa, preferably in the range of 10 Pa to 2000 Pa.

The reaction of the solid material which contains elemental uranium and elemental molybdenum with the fluorine radicals proceeds without a need to heat the solid material. However, due to the exothermic nature of the reaction, heat may be generated, and may be controlled e.g. by adjusting the velocity of the gas flow and/or the concentration of the fluorine radicals contained therein.

It will also be understood by the skilled person that the reaction chamber, wherein the solid material is provided for a reaction with the fluorine radicals, should be inert to the fluorine radicals. For example, the reaction chamber may have a surface of passivated nickel or of Monel metal. Due to the high reactivity of fluorine radicals, the distance between the plasma source and the solid material in the reactor should be kept short, even if a remote plasma source is used. Thereby, the loss of fluorine radicals due to volume and surface recombination can be minimized.

If the step of providing a mixture containing $MoF_6$ and $UF_6$ comprises the reaction of the solid material with hydrogen radicals to obtain a solid material comprising $UH_3$ and the reconversion to elemental uranium, this reaction/reconversion can be carried out as a preliminary reaction in the same reaction system in which the reaction with the fluorine radicals would be carried out in a subsequent step. In particular, the solid material can be exposed to a gas flow comprising hydrogen radicals, and optionally a carrier gas. The hydrogen radicals are preferably generated in a plasma source, more preferably in a remote plasma source as discussed above. The hydrogen radicals can be generated from a hydrogen containing precursor compound in the plasma source. The hydrogen containing precursor compound may be, e.g., $H_2$.

The mixture containing $MoF_6$ and $UF_6$ which is provided as an initial metal fluoride mixture is preferably a gas phase mixture containing $MoF_6$ and $UF_6$ mixed in gaseous form. The gas flow may further comprise a carrier gas. Typically, the carrier gas, if present, is a noble gas such as argon. For example, when the mixture containing $MoF_6$ and $UF_6$ is provided by exposing a solid material containing uranium and molybdenum to a gas flow comprising the fluorine radicals, the gas flow can be conveniently used following the contact with the solid material to transport the $MoF_6$ and $UF_6$ as gaseous reaction products from the reaction chamber. Due to the relatively low boiling point or sublimation temperature of $MoF_6$ and $UF_6$, respectively, a gas phase mixture containing $MoF_6$ and $UF_6$ is provided at moderate temperatures, such that no specific measures have to be taken to allow the fluorides to enter the gas phase.

Incidentally, the volatility of $MoF_6$ and $UF_6$ is higher than that of many other metal fluorides. Thus, a gas phase mixture containing $MoF_6$ and $UF_6$ can also be conveniently separated from other metal fluorides that may be formed during a reaction of a solid material containing uranium and molybdenum with fluorine radicals. As set out above, the solid material can be provided e.g. by irradiating a solid material which contains elemental uranium enriched in the isotope uranium-235 with neutrons. During the fission process triggered by the irradiation, other metals may be formed as side products. Moreover, the uranium targets may comprise aluminum.

In view of the above, it will be understood that the process in accordance with the first aspect of the invention preferably comprises:
  a step of providing a mixture containing $MoF_6$ and $UF_6$ as an initial metal fluoride mixture, which step comprises
    generating fluorine radicals in a plasma source, preferably in a remote plasma source,
    reacting a solid material containing elemental uranium and elemental molybdenum with the fluorine radicals, wherein the reaction comprises exposing the solid material to a gas flow comprising the fluorine radicals to obtain a gas phase mixture containing $MoF_6$ and $UF_6$ mixed in gaseous form;
  a dissolution step, which comprises dissolving $MoF_6$ and $UF_6$ in a liquid phase or a supercritical fluid phase to obtain a solution containing both $MoF_6$ and $UF_6$ in dissolved form;
  a precipitation step, which comprises reducing the $UF_6$ contained in the solution to $UF_5$ and allowing it to precipitate from the solution; and
  a separation step, which comprises
    (i) separating the precipitated $UF_5$ from the solution; or
    (ii) removing the liquid phase or supercritical fluid phase of the solution in the presence of the precipitated $UF_5$ to obtain a solid phase containing the precipitated $UF_5$ and molybdenum fluoride, and separating the $UF_5$ and the molybdenum fluoride or a conversion product thereof which may be obtained by further converting the molybdenum fluoride to another molybdenum compound.

The mixture containing $MoF_6$ and $UF_6$ which is provided as an initial metal fluoride mixture may be subjected to the dissolution step of the process in accordance with the first aspect of the invention as such, e.g. by feeding a gas phase mixture containing $MoF_6$ and $UF_6$ into a liquid phase or into a supercritical fluid phase, or by first depositing the $MoF_6$ and the $UF_6$ from a gas phase mixture via cooling, and subsequently dissolving the deposited $MoF_6$ and $UF_6$.

Alternatively, a part of the $UF_6$ contained in the initial fluoride mixture may be separated from the initial metal fluoride mixture in an additional treatment step carried out before the dissolution step. For example, if it is intended to recover a molybdenum compound using the process in accordance with the first aspect of the invention, it may be desirable to reduce the content of $UF_6$ in order to optimize the yield during the separation step. Similarly, if it is intended to recover uranium or a uranium compound using the process in accordance with the first aspect of the invention, it may be efficient to recover a part of the uranium as $UF_6$ directly from the initial fluoride mixture in such an additional treatment step.

In order to accomplish such a separation of $UF_6$, it is preferred for the process in accordance with the first aspect of the present invention that the mixture containing $MoF_6$ and $UF_6$ which is provided as an initial metal fluoride mixture is a gas phase mixture containing $MoF_6$ and $UF_6$ mixed in gaseous form, and that the process comprises a step (also referred to as an "initial deposition step" herein) wherein the gas phase mixture containing $MoF_6$ and $UF_6$ is cooled to a temperature where a portion of the $UF_6$ contained in the gas phase is deposited and is removed from the gas phase. This initial deposition step yields a mixture containing $MoF_6$ and $UF_6$ wherein the content of $UF_6$ is reduced and the ratio of $MoF_6$ to $UF_6$ is increased compared to the initial metal fluoride mixture. In addition, it yields deposited $UF_6$, which can be recovered. As will be understood, the initial deposition step, if comprised in the process according to the first aspect of the invention, is carried out prior to the dissolution step.

When the gas phase is cooled to a temperature where the partial pressure of the $UF_6$ in the gas phase is higher than the vapor pressure of $UF_6$ at the temperature to which the gas phase is cooled, $UF_6$ is deposited, typically as a solid phase. It can thus be removed from the gas phase and be separated from the $MoF_6$. It is noted in this regard that the vapor pressure of $MoF_6$ at a given temperature is typically below the one of $UF_6$. The vapor pressure of $UF_6$ can be calculated between $-15°$ C. and $0°$ C. using the equation:

$$p = 1.33 \cdot 10^{\left(-\frac{2751\,K}{T[K]} - 75.0 \cdot e^{-\frac{2560\,K}{T[K]}} - 1.01 \cdot log(T) + 13.797\right)} \text{mbar}$$

(D. R. Llewellyn, J. Chem. Soc. (1953) 28).

For $MoF_6$, the calculation can be carried out according to the following equation between −60° C. and −8.7° C.:

$$p = 1.33 \cdot 10^{(10.216 - \frac{2166.5\ K}{T[K]})} \text{mbar}$$

(G. H. Cady, G. B. Hargreaves, J. Chem. Soc. (1961) 1563).

Extrapolation of the calculated values allows the following vapor pressures $p_{Vap}$ for $UF_6$ and $MoF_6$ to be estimated as a function of temperature:

| Temperature [° C.] | $p_{Vap}\ UF_6$ [Pa] | $p_{Vap}\ MoF_6$ [Pa] | $p_{Vap}(UF_6)/p_{vap}(MoF_6)$ |
|---|---|---|---|
| −10 | 1042 | 12791 | 12.3 |
| −30 | 157 | 2690 | 17.2 |
| −50 | 17 | 428 | 25.8 |
| −70 | 1 | 47 | 42.4 |

The partial pressures of $UF_6$ and $MoF_6$ in a gas phase mixture provided as the initial metal fluoride mixture can be adjusted, e.g., by exposing a solid material which contains elemental uranium and elemental molybdenum to a gas flow comprising fluorine radicals, and by controlling the concentration and the mass flow of the fluorine radicals or their precursor in the gas flow, and of a carrier gas which may be contained in the gas flow. The total pressure in a reaction system wherein the reaction between the solid material and the fluorine radicals is carried out is typically in the range of 10 Pa to 3000 Pa, preferably in the range of 10 Pa to 2000 Pa. The partial pressure of $UF_6$ is preferably in a range of 10 Pa to 500 Pa. The partial pressure of $MoF_6$ is preferably in the range of 0.1 Pa to 5 Pa.

The initial deposition step is preferably carried out as a part of the process in accordance with the first aspect of the present invention in cases where the mixture containing $MoF_6$ and $UF_6$ which is provided as an initial metal fluoride mixture is a gas phase mixture containing $MoF_6$ and $UF_6$ mixed in gaseous form, and the partial pressure of $UF_6$ ($p(UF_6)$) in a gas phase mixture is significantly higher than the partial pressure of $MoF_6$ ($p(MoF_6)$), e.g. in cases where the ratio $p(UF_6)/p(MoF_6)$ is >10.

During the initial deposition step, the gas phase mixture containing $MoF_6$ and $UF_6$ is typically cooled to a temperature of less than −10° C., preferably less than −50° C., and more preferably less than −70° C. A suitable temperature can be selected taking into account the partial pressure of $UF_6$ in the gas phase mixture and the vapor pressure of $UF_6$ at various temperatures as indicated in the table above. As will be understood by the skilled reader, the temperature should be such that the partial pressure of $UF_6$ in the gas phase is higher than its vapor pressure at that temperature, but the partial pressure of $MoF_6$ in the gas phase is below its vapor pressure at that temperature. A suitable temperature at which the cooling step is carried out can be determined taking this into account, together with the relative concentrations of $MoF_6$ and $UF_6$ in the gas phase mixture. Thus, $UF_6$ can be deposited, typically as a solid phase.

Cooling the gas phase mixture can conveniently be accomplished in one or more cold traps. Cooling media to achieve temperatures below the above preferred limits known to the skilled person, and can be provided individually e.g. using salt/ice mixtures or mixtures of a solvent and dry ice, or by using a cryostat.

Multiple cooling steps can be carried out sequentially in the initial deposition step. If multiple cooling steps, e.g. two or three, are to be carried out, this can be conveniently be accomplished using two or three cold traps. They can be operated in series, at the same temperature or at decreasing temperatures.

In view of the above, it will be understood that the process in accordance with the first aspect of the invention preferably comprises:
  a step of providing a mixture containing $MoF_6$ and $UF_6$ as an initial metal fluoride mixture, which step comprises generating fluorine radicals in a plasma source, preferably in a remote plasma source,
  reacting a solid material containing elemental uranium and elemental molybdenum with the fluorine radicals, wherein the reaction comprises exposing the solid material to a gas flow comprising the fluorine radicals to obtain a gas phase mixture containing $MoF_6$ and $UF_6$ mixed in gaseous form;
  a step wherein the gas phase mixture containing $MoF_6$ and $UF_6$ provided as an initial metal fluoride mixture is cooled to a temperature where a portion of the $UF_6$ contained in the gas phase is deposited and removed from the gas phase;
  a dissolution step, which comprises dissolving the remaining $MoF_6$ and $UF_6$ in a liquid phase or a supercritical fluid phase to obtain a solution containing both $MoF_6$ and $UF_6$ in dissolved form;
  a precipitation step, which comprises reducing the $UF_6$ contained in the solution to $UF_5$ and allowing it to precipitate from the solution; and
  a separation step, which comprises
  (i) separating the precipitated $UF_5$ from the solution; or
  (ii) removing the liquid phase or supercritical fluid phase of the solution in the presence of the precipitated $UF_5$ to obtain a solid phase containing the precipitated $UF_5$ and molybdenum fluoride, and separating the $UF_5$ and the molybdenum fluoride or a conversion product thereof which may be obtained by further converting the molybdenum fluoride to another molybdenum compound.

It will be understood by the skilled reader that the dissolution step of the preferred/more preferred process variant above is carried out after the step wherein the gas phase mixture containing $MoF_6$ and $UF_6$ provided as an initial metal fluoride mixture is cooled to a temperature where a portion of the $UF_6$ contained in the gas phase is deposited and removed from the gas phase, and that the reference to the "remaining $MoF_6$ and $UF_6$" in the context of the dissolution step relates to the $MoF_6$ and $UF_6$ which remains in the mixture after a portion of the $UF_6$ contained in the gas phase has been removed from the mixture.

In the dissolution step of the process in accordance with the first aspect of the present invention, $MoF_6$ and $UF_6$ are dissolved in a liquid phase or a supercritical fluid phase to obtain a solution containing both $MoF_6$ and $UF_6$ in dissolved form. As will be understood, the $MoF_6$ and the $UF_6$ which are dissolved in this step are derived from the mixture containing $MoF_6$ and $UF_6$ which is provided as an initial metal fluoride mixture. However, it is not necessary that the solution contains all the $MoF_6$ and $UF_6$ which is contained in the initial metal fluoride mixture. As discussed above, it is possible to carry out additional treatment steps prior to the dissolution step especially to separate a portion of the $UF_6$ from the $MoF_6$ in the initial metal fluoride mixture, e.g. the initial deposition step discussed above.

Thus, generally either the mixture of $MoF_6$ and $UF_6$ which is contained in the initial metal fluoride mixture is dissolved in the dissolution step, or a mixture of $MoF_6$ and $UF_6$ is dissolved in the dissolution step which results from an initial deposition step wherein a gas phase mixture containing $MoF_6$ and $UF_6$ is cooled to a temperature where a portion of the $UF_6$ contained in the gas phase is deposited and removed from the gas phase.

If the $MoF_6$ and $UF_6$ to be dissolved in the dissolution step are contained in a gas phase, the dissolution can be accomplished e.g. by feeding a gas phase mixture containing $MoF_6$ and $UF_6$ into the liquid phase or into the supercritical fluid phase.

Alternatively, if the $MoF_6$ and $UF_6$ to be dissolved in the dissolution step are contained in a gas phase mixture, the process may further comprise a step prior to the dissolution step wherein the gas phase mixture containing $MoF_6$ and $UF_6$ is cooled to a temperature where $MoF_6$ and $UF_6$ contained in the gas phase are deposited as a mixture containing $MoF_6$ and $UF_6$, the mixture is recovered, and is subsequently subjected, optionally after re-evaporation to provide a gas phase mixture containing $MoF_6$ and $UF_6$ in gaseous form, to the dissolution step. If the recovered mixture is re-evaporated, the gas phase mixture containing $MoF_6$ and $UF_6$ can be dissolved e.g. by feeding the gas phase mixture into the liquid phase or into the supercritical fluid phase. If the recovered mixture is a solid mixture, it can be dissolved e.g. by adding it to a liquid phase or to a supercritical fluid phase as such, or by adding the liquid phase or into the supercritical fluid phase to the solid mixture.

If the process in accordance with the first aspect of the invention comprises the initial deposition step discussed above and the step wherein the gas phase mixture containing $MoF_6$ and $UF_6$ is cooled to a temperature where the $MoF_6$ and the $UF_6$ contained in the gas phase are deposited as a mixture containing $MoF_6$ and $UF_6$, the latter step is carried out after the initial deposition step.

As will be understood by the skilled reader, if the gas phase mixture containing $MoF_6$ and $UF_6$ is cooled to a temperature where the $MoF_6$ and the $UF_6$ contained in the gas phase are deposited as a mixture containing $MoF_6$ and $UF_6$, the temperature for the cooling step is preferably chosen sufficiently low such that a large part of the metal fluorides is deposited, or that the deposition occurs quantitatively. Typically, the gas phase is exposed to temperatures of $-150°$ C. or less, preferably of $-190°$ C. or less. For example, a cold trap cooled with liquid nitrogen may be used for this purpose.

In the dissolution step, the $MoF_6$ and $UF_6$ are dissolved in a liquid phase or a supercritical fluid phase to obtain a solution containing both $MoF_6$ and $UF_6$ in dissolved form. Thus, unless indicated otherwise, the reference to a solvent is intended to encompass a solvent in a liquid state as well as a solvent in a supercritical fluid state, and the reference to a dissolution equally encompasses the case wherein the dissolved fluorides are contained in a liquid solvent, and the case wherein the dissolved fluorides are contained in a supercritical fluid as a solvent. Preferably, the $MoF_6$ and $UF_6$ are dissolved in a liquid phase to obtain a solution containing both $MoF_6$ and $UF_6$ in dissolved form.

The liquid phase or the supercritical fluid phase may comprise a single solvent, or a combination of solvents. It is preferred that they comprise a single solvent.

As preferred examples for a suitable solvent, reference can be made to liquid $SO_2$ and to CO in a supercritical fluid state. Most preferred as a solvent is liquid $SO_2$. Thus, it is preferred that $MoF_6$ and $UF_6$ are dissolved in a liquid phase comprising or consisting of liquid $SO_2$ as a solvent, or in a supercritical fluid phase comprising or consisting of CO in a supercritical state as a solvent. It is most preferred that $MoF_6$ and $UF_6$ are dissolved in a liquid phase consisting of liquid $SO_2$ as a solvent.

As will be understood by the skilled reader, it may be advantageous to maintain the solvent at a reduced temperature in order to keep it in the desired form, preferably in the liquid form. If $SO_2$ is used as a solvent in the dissolution step, it is typically maintained at a temperature of $-45°$ C. or less. If CO is used as a solvent in supercritical fluid state, it is typically maintained at a temperature between $-140°$ C. and $25°$ C. and a pressure between 3500 kPa and 12500 kPa. Alternatively, a solvent such as $SO_2$ which is in a gaseous form at ambient temperature and pressure can be used by condensing the gas at a sufficiently low temperature and allowing the liquid phase which is thus provided to warm up under autogenous pressure conditions in a pressure resistant vessel. Thus, the separation step can be carried out at room temperature.

It is advantageous if the liquid phase or the supercritical fluid phase used for the dissolution step comprises a fluorine atom scavenger, i.e. a compound which is able to bind fluorine atoms which may be formed during or after the dissolution step in the solution, or if the liquid phase or the supercritical fluid phase comprises a solvent which functions as a fluorine atom scavenger. Also in this regard, liquid $SO_2$, and CO in a supercritical fluid state are preferred solvents, and liquid $SO_2$ is a particularly preferred solvent, since these solvents have the capacity to bind fluorine atoms and to act as fluorine atom scavenger.

In view of the above, it will be understood that the process in accordance with the first aspect of the invention preferably comprises:

a step of providing a mixture containing $MoF_6$ and $UF_6$ as an initial metal fluoride mixture, which step comprises generating fluorine radicals in a plasma source, preferably in a remote plasma source, reacting a solid material containing elemental uranium and elemental molybdenum with the fluorine radicals, wherein the reaction comprises exposing the solid material to a gas flow comprising the fluorine radicals to obtain a gas phase mixture containing $MoF_6$ and $UF_6$ mixed in gaseous form;

optionally a step wherein the gas phase mixture containing $MoF_6$ and $UF_6$ provided as an initial metal fluoride mixture is cooled to a temperature where a portion of the $UF_6$ contained in the gas phase is deposited and removed from the gas phase;

a dissolution step, which comprises dissolving the remaining $MoF_6$ and $UF_6$ in a liquid phase comprising or consisting of liquid $SO_2$ to obtain a solution containing both $MoF_6$ and $UF_6$ in dissolved form;

a precipitation step, which comprises reducing the $UF_6$ contained in the solution to $UF_5$ and allowing it to precipitate from the solution; and a separation step, which comprises
(i) separating the precipitated $UF_5$ from the solution; or
(ii) removing the liquid phase of the solution in the presence of the precipitated $UF_5$ to obtain a solid phase containing the precipitated $UF_5$ and molybdenum fluoride, and separating the $UF_5$ and the molybdenum fluoride or a conversion product thereof which may be obtained by further converting the molybdenum fluoride to another molybdenum compound.

In the precipitation step of the process in accordance with the first aspect of the present invention, the $UF_6$ contained in the solution is reduced to $UF_5$ and precipitates from the solution.

The reduction of $UF_6$ to $UF_5$ can be conveniently accomplished via photoreduction, i.e. by irradiating the solution containing $UF_6$ in dissolved form with light of a suitable wavelength. For example, the photoreduction proceeds efficiently via irradiation with light of a wavelength in the range of 340 to 410 nm, preferably at a wavelength in the range of 380 to 400 nm, and most preferably at 395 nm. In this wavelength range, $UF_6$ is efficiently converted to $UF_5$, while $MoF_6$ contained in the solution does not show any significant absorption, and remains unaffected by the light.

As noted above, it is advantageous if $MoF_6$ and $UF_6$ are dissolved in the dissolution step in a liquid phase or a supercritical fluid phase which comprises a fluorine atom scavenger. This fluorine atom scavenger is able to bind the fluorine atom which is released from the $UF_6$ during its reduction.

Advantageously, the solubility characteristics of $UF_5$ differ significantly from those of $UF_6$, and also from those of the molybdenum fluoride. Without wishing to be bound by theory, this may be due to the polymeric solid-state structure of $UF_5$. Thus, the $UF_5$ which is formed as a result of the reduction can be allowed to precipitate from the solution due to its limited solubility, i.e. generally, the precipitation of the $UF_5$ occurs spontaneously. For example, the precipitation occurs spontaneously during or after the formation of $UF_5$ in a liquid phase comprising or consisting of liquid $SO_2$ as a solvent, a liquid phase comprising or consisting of liquid CO as a solvent, or in a supercritical fluid phase comprising or consisting of CO as a solvent.

Thus, as will be understood from the above, the precipitation step of the process in accordance with the first aspect of the present invention generally yields a combination of a liquid phase or a supercritical fluid phase as a solution comprising dissolved $MoF_6$, and the precipitated $UF_5$ as a solid phase.

In the separation step of the process in accordance with the first aspect of the present invention, the precipitated $UF_5$ is separated from the molybdenum compound, either in the presence or in the absence of a liquid phase/supercritical fluid phase. Thus, the separation step comprises (i) separating the precipitated $UF_5$ from the solution; or (ii) removing the liquid phase or supercritical fluid phase of the solution in the presence of the precipitated $UF_5$ to obtain a solid phase containing the precipitated $UF_5$ and molybdenum fluoride, and separating the $UF_5$ and the molybdenum fluoride or a conversion product thereof which may be obtained by further converting the molybdenum fluoride to another molybdenum compound.

If the precipitated $UF_5$ is separated from the solution in accordance with option (i), the separation step may further comprise the recovery of $MoF_6$ from the solution after the separation of the precipitated $UF_5$ from the solution. Alternatively, the separation step may further comprise converting $MoF_6$ contained in the solution to another molybdenum compound prior to or after the separation of the precipitated $UF_5$ from the solution, and recovering the molybdenum compound from the solution after the separation of the precipitated $UF_5$ from the solution.

Thus, the process in accordance with the first aspect of the invention allows a molybdenum compound to be obtained from a mixture of $MoF_6$ and $UF_6$, including the case where $MoF_6$ and $UF_6$ are prepared via reaction of a solid material (e.g. an alloy) which contains elemental uranium and elemental molybdenum, with fluorine radicals. As a result, the process of the present invention can be advantageously used, e.g., to provide a molybdenum-99 compound wherein the molybdenum-99 is formed via fission of uranium, or to recover uranium from uranium-molybdenum alloys used for the preparation of U-Mo fuels.

For example, relying on option (i) above, $MoF_6$ contained in the solution can be recovered as such from the solution following the separation of the precipitated $UF_5$ from the solution. Alternatively, the $MoF_6$ contained in the solution can be converted to a molybdate ion $MoO_4^{2-}$, preferably via reaction with hydroxy ions, which may be added e.g. in the form of NaOH or KOH to the solution. The molybdate may subsequently be recovered from the solution, e.g. in the form of a sodium or potassium salt.

In accordance with a further alternative, the $MoF_6$ can be reduced to $MoF_5$ in the solution and can be recovered as $MoF_5$ following the separation of the precipitated $UF_5$ from the solution. The reduction of $MoF_6$ to $MoF_5$ can be accomplished e.g. via photoreduction, i.e. by irradiating the solution containing $MoF_6$ in dissolved form with light of a suitable wavelength. For example, the photoreduction proceeds efficiently via irradiation with light of a wavelength of 270 nm or less, preferably 230 to 260 nm. In contrast to $UF_5$, $MoF_5$ shows a significant solubility, e.g. in a liquid phase comprising or consisting of liquid $SO_2$ as a solvent, a liquid phase comprising or consisting of liquid CO as a solvent, or in a supercritical fluid phase comprising or consisting of CO in a supercritical state as a solvent. Thus, the conversion of $MoF_6$ to $MoF_5$ can be carried out before the precipitated $UF_5$ is separated from the solution containing the molybdenum fluoride, or after the precipitated $UF_5$ is separated from the solution containing the molybdenum fluoride.

In order to separate the precipitated $UF_5$ from the solution containing the molybdenum fluoride, conventional methods for solid/liquid separation can be relied on. For example, the solid precipitated $UF_5$ can be separated from the solution via decantation of the solution, or via filtration of the solution.

Alternatively, also relying on option (i) above, the precipitated $UF_5$ can be separated from a solution containing $MoF_6$ via the evaporation of the liquid phase or the supercritical fluid phase together with the $MoF_6$, followed by the recovery of the $MoF_6$. For example, if the precipitated $UF_5$ is separated from a solution containing $MoF_6$ dissolved in a liquid phase via the evaporation of the liquid phase together with the $MoF_6$, the $MoF_6$ can be advantageously recovered via re-condensation of the liquid phase together with the $MoF_6$, to obtain a solution containing $MoF_6$ separate from the precipitated $UF_5$. Due to the relatively high vapor pressure/low boiling point of $MoF_6$, the molybdenum fluoride can be conveniently evaporated in the form of $MoF_6$. In accordance with another exemplary approach relying on option (i), if the precipitated $UF_5$ is separated from a solution containing $MoF_6$ via fractionated distillation of the $MoF_6$ and of the liquid phase or the supercritical fluid phase, the $MoF_6$ can be separately recovered.

Thus, in accordance with a first preferred variant of the separation step, the separation step comprises either separating the precipitated $UF_5$ from a solution containing $MoF_6$ dissolved in a liquid phase via the evaporation of the liquid phase together with the $MoF_6$, and recovering the $MoF_6$ via re-condensation of the liquid phase together with the $MoF_6$, to obtain a solution containing $MoF_6$ separate from the precipitated $UF_5$, and treating the solution containing $MoF_6$ obtained after the separation of the precipitated $UF_5$ with $OH^-$ ions to obtain a molybdate, which can subsequently be recovered from the solution.

In accordance with still another preferred variant of the separation step, the separation step comprises reducing the $MoF_6$ contained in the solution via photoreduction to obtain a solution containing $MoF_5$ prior to or after the separation of the precipitated $UF_5$ from the solution, separating the $UF_5$ from the solution via decantation or filtration of the solution, and recovering $MoF_5$ from the solution via evaporation of the solvent after the separation of the precipitated $UF_5$ from the solution.

In view of the above, it will be understood that the process in accordance with the first aspect of the invention preferably comprises:

a step of providing a mixture containing $MoF_6$ and $UF_6$ as an initial metal fluoride mixture, which step comprises generating fluorine radicals in a plasma source, preferably in a remote plasma source, reacting a solid material containing elemental uranium and elemental molybdenum with the fluorine radicals, wherein the reaction comprises exposing the solid material to a gas flow comprising the fluorine radicals to obtain a gas phase mixture containing $MoF_6$ and $UF_6$ mixed in gaseous form;

optionally a step wherein the gas phase mixture containing $MoF_6$ and $UF_6$ provided as an initial metal fluoride mixture is cooled to a temperature where a portion of the $UF_6$ contained in the gas phase is deposited and removed from the gas phase;

a dissolution step, which comprises dissolving the remaining $MoF_6$ and $UF_6$ in a liquid phase comprising or consisting of liquid $SO_2$ to obtain a solution containing both $MoF_6$ and $UF_6$ in dissolved form;

a precipitation step, which comprises reducing the $UF_6$ contained in the solution to $UF_5$ and allowing it to precipitate from the solution; and a separation step which comprises (i.a) separating the precipitated $UF_5$ from the solution, and recovering $MoF_6$ from the solution after the separation of the precipitated $UF_5$ from the solution, or (i.b) separating the precipitated $UF_5$ from the solution, converting $MoF_6$ contained in the solution to another molybdenum compound prior to or after the separation of the precipitated $UF_5$ from the solution, and recovering the molybdenum compound from the solution after the separation of the precipitated $UF_5$ from the solution.

As noted above, the separation step may comprise, in line with option (ii), removing the liquid phase or supercritical fluid phase of the solution in the presence of the precipitated $UF_5$ to obtain a solid phase containing the precipitated $UF_5$ and molybdenum fluoride, and separating the $UF_5$ and the molybdenum fluoride.

In line with this approach, the liquid phase or supercritical fluid phase of the solution is preferably removed via evaporation to obtain the solid phase containing the precipitated $UF_5$ and molybdenum fluoride.

As indicated by the generic reference to molybdenum fluoride, the solid phase may contain $MoF_6$, which is derived from the initial metal fluoride mixture, or $MoF_5$, which can be prepared via reduction of the $MoF_6$ prior to the removal of the liquid phase or the supercritical fluid phase. Moreover, if $SO_2$ is comprised by the liquid phase in the dissolution step, $MoF_6$ can be allowed to react with $SO_2$ to form $MoOF_4$ by keeping the $MoF_6$ in contact with $SO_2$ for a sufficiently long period of time.

If the solid phase obtained during the separation step contains the precipitated $UF_5$ and $MoF_6$, $UF_5$ and $MoF_6$ can be separated by evaporating the $MoF_6$, for example by keeping the solid phase at a temperature in the range of −20 to 100° C. If desired, the $MoF_6$ can be re-condensed separate from the $UF_5$. Thus, this approach allows the $UF_5$ and/or the $MoF_6$ being recovered.

Alternatively, as noted above, the separation step may comprise reducing the $MoF_6$ contained in the solution to obtain a solution containing $MoF_5$ prior to removing the liquid phase or supercritical fluid phase of the solution. The resulting solid phase obtained by removing the liquid phase or supercritical fluid phase of the solution contains the precipitated $UF_5$ and $MoF_5$. The conversion of $MoF_6$ to $MoF_5$ prior to the separation of the $UF_5$ and the molybdenum fluoride may facilitate the removal of the liquid phase or supercritical fluid phase without significant loss of molybdenum fluoride, since the vapor pressure of $MoF_5$ is lower than that of $MoF_6$.

As noted above, a further alternative in the case where $SO_2$ is comprised by the liquid phase in the dissolution step, $MoF_6$ may be converted to $MoOF_4$ via reaction with $SO_2$, and the separation of the dissolved $MoOF_4$ from solid $UF_5$ can be accomplished via filtration of the $SO_2$ solution containing dissolved $MoOF_4$ from the solid $UF_5$.

In accordance with still a further alternative, a solid phase mixture of $UF_5$ and $MoOF_4$ can be obtained, and the $MoOF_4$ can be removed via sublimation. The sublimation is performed preferably between 60 and 160° C., more preferably between 70 and 120° C., most preferably at 90° C.

As described above, the reduction of $MoF_6$ to $MoF_5$ can be accomplished e.g. via photoreduction, i.e. by irradiating the solution containing $MoF_6$ with light of a suitable wavelength. For example, the photoreduction proceeds efficiently via irradiation with light of a wavelength of 270 nm or less, preferably 230 to 260 nm.

The precipitated $UF_5$ and $MoF_5$ contained in a solid phase that can be obtained in accordance with option (ii) of the separation step can be efficiently separated via sublimation of the $MoF_5$, which may be accompanied by the deposition of the $MoF_5$ separate from the $UF_5$. Thus, $UF_5$ and/or $MoF_5$ may be recovered. This process is performed preferably between 60 and 160° C., more preferably between 70 and 120° C., most preferably at 90° C.

In accordance with a related approach encompassed by option (ii) of the separation step, the $UF_6$ and the $MoF_6$ can be reduced in the precipitation step together via photoreduction to $UF_5$ and $MoF_5$. In the subsequent separation step, the liquid phase or supercritical fluid phase of the solution can be removed in the presence of the precipitated $UF_5$ to obtain a solid phase containing the precipitated $UF_5$ and $MoF_5$, and the $UF_5$ and the $MoF_5$ can be separated via sublimation of the $MoF_5$ and its deposition separate from the $UF_5$.

Irrespective of whether the separation step is carried out relying on option (i) or option (ii), it allows molybdenum to be recovered e.g. in the form of $MoF_6$, $MoF_5$, $MoOF_4$, or in the form of a compound to which the molybdenum fluoride has been converted, e.g. as a molybdate.

Similarly, the separation step allows the $UF_5$ to be recovered. The recovered $UF_5$ can, e.g., be reduced to uranium metal. It is also possible to reconvert it to $UF_6$ via a fluorination reaction, which allows the content of uranium- 235 to be adjusted using known methods of isotope separation. Subsequently, the fluoride can be reduced to elemental uranium.

The following items provide a summary of important embodiments of the process in accordance with the first aspect of the invention.

1. A process comprising
   a step of providing a mixture containing $MoF_6$ and $UF_6$ as an initial metal fluoride mixture;
   a dissolution step, which comprises dissolving $MoF_6$ and $UF_6$ in a liquid phase or a supercritical fluid phase to obtain a solution containing both $MoF_6$ and $UF_6$ in dissolved form;
   a precipitation step, which comprises reducing the $UF_6$ contained in the solution to $UF_5$ and allowing it to precipitate from the solution; and
   a separation step, which comprises
   (i) separating the precipitated $UF_5$ from the solution; or
   (ii) removing the liquid phase or supercritical fluid phase of the solution in the presence of the precipitated $UF_5$ to obtain a solid phase containing the precipitated $UF_5$ and molybdenum fluoride, and separating the $UF_5$ and the molybdenum fluoride or a conversion product thereof which may be obtained by further converting the molybdenum fluoride to another molybdenum compound.
2. The process according to item 1, wherein the molar ratio of $MoF_6$ to $UF_6$ in the initial metal fluoride mixture ranges from 1:400 to 100:1, more preferably from 1:5 to 10:1.
3. The process according to item 1 or 2, wherein the mixture containing $MoF_6$ and $UF_6$ which is provided as an initial metal fluoride mixture is a gas phase mixture containing $MoF_6$ and $UF_6$ mixed in gaseous form.
4. The process according to item 3, wherein the gas phase mixture containing $MoF_6$ and $UF_6$ further contains a carrier gas.
5. The process according to item 4, wherein the carrier gas is a noble gas, and is preferably argon.
6. The process according to any of items 3 to 5, which further comprises a step wherein the gas phase mixture containing $MoF_6$ and $UF_6$ is cooled to a temperature where $MoF_6$ and $UF_6$ contained in the gas phase are deposited as a mixture containing $MoF_6$ and $UF_6$, the mixture is recovered, and
   is subsequently subjected, optionally after re-evaporation to provide a gas-phase mixture containing $MoF_6$ and $UF_6$ in gaseous form, to the dissolution step.
7. The process according to any of items 3 to 6, wherein the $MoF_6$ and $UF_6$ are dissolved in the dissolution step by feeding a gas phase mixture containing the $MoF_6$ and $UF_6$ into the liquid phase or the supercritical fluid phase.
8. The process according to any of items 3 to 7, which further comprises, prior to the dissolution step, a step wherein the gas phase mixture containing $MoF_6$ and $UF_6$ is cooled to a temperature where a portion of the $UF_6$ contained in the gas phase is deposited and removed from the gas phase.
9. The process according to item 8, wherein the step of cooling the gas phase mixture containing $MoF_6$ and $UF_6$ to a temperature where a portion of the $UF_6$ contained in the gas phase is deposited and removed from the gas phase is carried out multiple times, preferably two or three times.
10. The process according to any of items 3 to 9, which comprises the step wherein the gas phase mixture containing $MoF_6$ and $UF_6$ is cooled to a temperature where a portion of the $UF_6$ contained in the gas phase is deposited and removed from the gas phase, and wherein the temperature is −10° C. or less, preferably −50° C. or less, more preferably −70° C. or less.
11. The process according to item 10, wherein the gas phase mixture is cooled in a cold trap.
12. The process according to item 10, wherein the gas phase mixture is cooled in multiple cold traps which are operated in series, at the same temperature or at decreasing temperatures.
13. The process according to any of items 1 to 12, wherein $MoF_6$ and $UF_E$ are dissolved in the dissolution step in a liquid phase or a supercritical fluid phase which comprises a fluorine atom scavenger.
14. The process according to any of items 1 to 13, wherein $MoF_6$ and $UF_6$ are dissolved in a liquid phase or a supercritical fluid phase which comprises a solvent that functions as a fluorine atom scavenger.
15. The process according to any of items 1 to 14, wherein $MoF_6$ and $UF_6$ are dissolved in the dissolution step in a liquid phase which comprises or consists of liquid $SO_2$ as a solvent or in a supercritical fluid phase which comprises or consists of CO in a supercritical state.
16. The process according to item 15, wherein $MoF_6$ and $UF_6$ are dissolved in the dissolution step in a liquid phase which comprises or which consists of liquid $SO_2$.
17. The process according to any of items 1 to 16, wherein $UF_6$ is reduced to $UF_5$ in the precipitation step via photoreduction.
18. The process according to item 17, wherein the photoreduction is accomplished via irradiation of the dissolved $UF_6$ with light at a wavelength of 340 to 410 nm, preferably 395 nm.
19. The process according to any of items 1 to 18, wherein the separation step comprises separating the precipitated $UF_5$ from the solution.
20. The process according to item 19, wherein the separation step further comprises recovering $MoF_6$ from the solution after the separation of the precipitated $UF_5$ from the solution.
21. The process according to item 19, wherein the separation step further comprises converting $MoF_6$ contained in the solution to another molybdenum compound prior to or after the separation of the precipitated $UF_5$ from the solution, and
   recovering the molybdenum compound from the solution after the separation of the precipitated $UF_5$ from the solution.
22. The process according to item 19, wherein the separation step comprises separating the precipitated $UF_5$ from the solution containing $MoF_6$ dissolved in a liquid phase or in a supercritical fluid phase via the evaporation of the solution containing the $MoF_6$, followed by the recovery of the $MoF_6$.
23. The process according to item 22, wherein the separation step comprises separating the precipitated $UF_5$ from a solution containing $MoF_6$ dissolved in a liquid phase via the evaporation of the solution containing the $MoF_6$, and recovering the $MoF_6$ via re-condensation of the solution containing the $MoF_6$ separate from the precipitated $UF_5$.
24. The process according to item 19, wherein the separation step comprises separating the precipitated $UF_5$ from the solution containing $MoF_6$ via decantation or filtration of the solution to obtain a solution containing $MoF_6$.

25. The process according to item 23 or 24, wherein the separation step further comprises treating the solution containing $MoF_6$ obtained after the separation of the precipitated $UF_5$ with $OH^-$ ions to obtain a molybdate.

26. The process according to item 25, wherein the molybdate is recovered from the solution.

27. The process according to item 19, wherein the separation step comprises reducing the $MoF_6$ contained in the solution to obtain a solution containing $MoF_5$ prior to or after the separation of the precipitated $UF_5$ from the solution.

28. The process according to item 27, wherein the reduction of $MoF_6$ in the solution is carried out via photoreduction.

29. The process according to item 28, wherein the photoreduction is accomplished via irradiation of $MoF_6$ in dissolved form with light at a wavelength of 270 nm or less.

30. The process according to any of items 27 to 29, wherein the separation step comprises separating the $UF_5$ from the solution via decantation or filtration of the solution.

31. The process according to any of items 27 to 30, wherein the separation step comprises recovering $MoF_5$ from the solution via evaporation of the solvent after the separation of the precipitated $UF_5$ from the solution.

32. The process according to any of items 1 to 18, wherein the separation step comprises (ii) removing the liquid phase or supercritical fluid phase of the solution in the presence of the precipitated $UF_5$ to obtain a solid phase containing the precipitated $UF_5$ and molybdenum fluoride, and separating the $UF_5$ and the molybdenum fluoride.

33. The process according to item 32, wherein the liquid phase or supercritical fluid phase of the solution is removed via evaporation.

34. The process according to item 32 or 33, wherein the solid phase contains the precipitated $UF_5$ and $MoF_6$, and wherein the $UF_5$ and $MoF_6$ are separated by evaporating the $MoF_6$.

35. The process according to item 32 or 33, wherein the separation step comprises reducing the $MoF_6$ contained in the solution to obtain a solution containing $MoF_5$ prior to removing the liquid phase or supercritical fluid phase of the solution, and wherein the solid phase obtained by removing the liquid phase or supercritical fluid phase of the solution contains the precipitated $UF_5$ and $MoF_5$.

36. The process according to item 35, wherein the reduction of $MoF_5$ in the solution is carried out via photoreduction.

37. The process according to item 36, wherein the photoreduction is accomplished via irradiation of $MoF_6$ in dissolved form with light at a wavelength of 270 nm or less.

38. The process according to any of items 35 to 37, wherein the precipitated $UF_5$ and $MoF_5$ are separated via sublimation of the $MoF_5$ and its deposition separate from the $UF_5$.

39. The process according to any of items 1 to 16, wherein the $UF_6$ and the $MoF_6$ are reduced in the precipitation step together via photoreduction to $UF_5$ and $MoF_5$, wherein the separation step comprises removing the liquid phase or supercritical fluid phase of the solution in the presence of the precipitated $UF_5$ to obtain a solid phase containing the precipitated $UF_5$ and $MoF_5$, and wherein the $UF_5$ and the $MoF_5$ are separated via sublimation of the $MoF_5$ and its deposition separate from the $UF_5$.

40. The process in accordance with item 16, wherein $MoF_6$ is allowed to react with the $SO_2$ to form $MoOF_4$, and the separation of the dissolved $MoOF_4$ from solid $UF_5$ is accomplished via filtration of the $SO_2$ solution containing dissolved $MoOF_4$ from the solid $UF_5$, or via sublimation of $MoOF_4$ from a solid mixture of $UF_5$ and $MoOF_4$.

41. The process according to any of items 1 to 40, wherein the $MoF_6$ contained in the initial metal fluoride mixture comprises the isotope molybdenum-99.

42. The process according to any of items 1 to 41, wherein the $UF_6$ contained in the initial metal fluoride mixture is enriched in uranium-235.

43. The process according to any of items 1 to 42, which further comprises a step of recovering the precipitated $UF_5$.

44. The process according to any of items 1 to 43, wherein the step of providing a mixture containing $MoF_6$ and $UF_6$ as an initial metal fluoride mixture comprises reacting a solid material, which contains elemental uranium and elemental molybdenum, with fluorine radicals, and wherein the reaction comprises exposing the solid material to a gas flow comprising the fluorine radicals, to obtain the mixture containing $MoF_6$ and $UF_6$.

45. The process according to item 44, wherein the step of providing a mixture containing $MoF_6$ and $UF_6$ as an initial metal fluoride mixture comprises irradiating a solid material which contains elemental uranium enriched in the isotope uranium-235 with neutrons to obtain a solid material comprising elemental uranium and elemental molybdenum, and wherein the elemental molybdenum comprises the isotope molybdenum-99.

46. The process according to item 44 or 45, wherein the solid material comprising elemental uranium and elemental molybdenum comprises the molybdenum at a weight ratio in the range of 0.02 to 1.0 wt %, more preferably 0.05 to 0.2 wt %, based on the total weight of uranium and molybdenum as 100 wt %.

47. The process according to item 44, wherein the solid material which contains elemental uranium and elemental molybdenum is a mixture of uranium enriched in the isotope uranium-235 and molybdenum, 48. The process according to item 47, wherein the solid material comprising elemental uranium and elemental molybdenum comprises the molybdenum at a weight ratio in the range of 5 to 12 wt %, preferably 7 to 10 wt %, based on the total weight of uranium and molybdenum as 100 wt %.

49. The process according to any of items 44 to 48, wherein the step of providing a mixture containing $MoF_6$ and $UF_6$ as an initial metal fluoride mixture comprises generating the fluorine radicals from a fluorine containing precursor compound in a plasma source, more preferably in a remote plasma source.

50. The process according to item 49, wherein the fluorine containing precursor compound is selected from $F_2$ and $NF_3$, and is more preferably $NF_3$.

51. The process according to any of items 44 to 50, wherein the gas flow further comprises a carrier gas.

52. The process according to any of items 44 to 51, wherein the mixture containing $MoF_6$ and $UF_6$ which is provided as an initial metal fluoride mixture is a gas phase mixture containing $MoF_6$ and $UF_6$ mixed in gaseous form.
53. The process according to any of items 44 to 52, wherein the reaction of the solid material with the fluorine radicals is carried out at a pressure in the range of 10 Pa to 3000 Pa.
54. The process according to any of items 45 to 53, wherein the step of providing a mixture containing $MoF_6$ and $UF_6$ as an initial metal fluoride mixture comprises, prior to the reaction of the solid material with fluorine radicals, irradiating a solid material which contains elemental uranium enriched in the isotope uranium-235 with neutrons and reacting the irradiated solid material with hydrogen radicals to obtain a solid material comprising $UH_3$; and reconverting the $UH_3$ to elemental U by subjecting it to an increased temperature.
55. The process according to item 54, wherein the hydrogen radicals are generated from a hydrogen containing precursor compound in a plasma source, more preferably in a remote plasma source.

In the following, the process in accordance with the preferred second aspect of the invention as set forth above will be discussed. Like the process of the preferred first aspect, the process can be suitably used e.g. to obtain molybdenum or a molybdenum compound, in particular to obtain molybdenum or a molybdenum compound containing the isotope molybdenum-99. Alternatively or concurrently, it can be used to obtain uranium or a uranium compound, in particular to obtain uranium or a uranium compound enriched in uranium-235.

The process in accordance with the second aspect comprises a step of providing a gas phase mixture containing $MoF_6$, $UF_6$ and a fluorine atom scavenger mixed in gaseous form (i.e. all three components are in gaseous form). Preferably, the gas phase mixture consists of the $MoF_6$, the $UF_6$ and the fluorine atom scavenger mixed in gaseous form.

The process can be applied to mixtures containing molar ratios of $MoF_6$ and $UF_6$ varying over wide ranges, e.g. from 1:400 to 100:1. Preferably the molar ratios are in the range of 1:5 to 10:1.

As will be understood from the above, the uranium contained in the $UF_6$ may be uranium enriched in uranium-235. The molybdenum contained in the $MoF_6$ may contain molybdenum-99.

The step of providing the gas phase mixture containing $MoF_6$ and $UF_6$ preferably comprises reacting a solid material which contains elemental uranium and elemental molybdenum with fluorine radicals to obtain a mixture containing $MoF_6$ and $UF_6$. The reaction comprises exposing the solid material to a gas flow comprising the fluorine radicals.

Also the uranium contained in the solid material may be uranium enriched in uranium-235. The molybdenum contained in the solid material may contain molybdenum-99.

The weight ratio of elemental uranium and elemental molybdenum in the solid material is not particularly limited with a view to the separation of the two elements via their fluorides. Typical contents of molybdenum range from 0.01 to 12 wt %, based on the total weight of uranium and molybdenum as 100 wt %.

In the case of a solid material comprising the isotope molybdenum-99 which is reacted with fluorine radicals, preferred contents of elemental molybdenum are in the range of 0.02 to 1.0 wt %, more preferably 0.05 to 0.2 wt %, based on the total weight of elemental uranium and elemental molybdenum as 100 wt %.

In the case of a solid material containing uranium and molybdenum which can be used in the preparation of an U-Mo fuel, and which can also be reacted with fluorine radicals to obtain the mixture containing $MoF_6$ and $UF_6$, preferred contents of elemental molybdenum are in the range of 5 to 12 wt %, more preferably 7 to 10 wt %, based on the total weight of elemental uranium and elemental molybdenum as 100 wt %.

In addition to U and Mo, the solid material which is reacted with fluorine radicals may contain other components, including other metals, or it may be free of other metals apart from uranium and molybdenum. For example, aluminum may be present as a matrix material in combination with uranium in uranium targets which are irradiated with neutrons to convert uranium into molybdenum-99.

The total content of elemental uranium and elemental molybdenum in the solid material which is reacted with fluorine radicals is preferably in the range of 30-100 wt %, more preferably 50-100 wt %. In this context, the weight percentage is based on the total mass of the material which comprises the uranium and the molybdenum as 100 wt %, excluding the mass of any cladding which may be applied to the material which comprises the uranium and the molybdenum. As will be understood by the skilled person, the material which comprises the uranium and the molybdenum, and which is also referred to as "meat" may be provided as a dispersed phase, wherein uranium and molybdenum are dispersed in a matrix material such as aluminum, or as a homogeneous or monolithic phase.

In the case of a solid material comprising the isotope molybdenum-99 which is reacted with fluorine radicals, preferred total contents of elemental uranium and elemental molybdenum are in the range of 30-100 wt %, more preferably 50-100 wt %, based on the total mass of the meat excluding any cladding.

In the case of a solid material containing uranium and molybdenum which is used in the preparation of an U-Mo fuel, and which can also be reacted with fluorine radicals to obtain the mixture containing $MoF_6$ and $UF_6$, preferred total contents of elemental uranium and elemental molybdenum are also in the range of 30-100 wt %, more preferably 50-100 wt %, based on the total mass of the meat excluding any cladding.

In the solid material containing elemental uranium and elemental molybdenum, the two elements may be combined e.g. in the form of a mixture, or in the form of an alloy. Since, as noted above, further components apart from uranium and molybdenum may be present in the solid material, it is also possible that the uranium, the molybdenum, or both, form an alloy with one or more of such other components. It is noted that the reference to an alloy herein encompasses intermetallic phases, to the extent that such a phase is formed by the components of the alloy under consideration. Reference to an alloy also encompasses an alloy formed from one or more metals, such as uranium, and one or more semimetals, such as silicon. As a preferred example of a solid material containing elemental uranium and elemental molybdenum, reference can further be made to a solid material containing uranium or an uranium alloy (e.g. uranium silicide) wherein molybdenum has been formed via irradiation with neutrons and is dispersed in the uranium or the uranium alloy.

The form in which the solid material is subjected to a reaction with the fluorine radicals is not particularly limited. The solid material may have a compact shape, e.g. a regular compact shape such as a plate, a cylinder or a sphere. The solid material may also be reacted with the fluorine radicals in the form of a powder. For example, in certain applications, uranium and molybdenum may be encapsulated by another metal or dispersed in a matrix of another metal, so that it may be useful to subject such an encapsulated or dispersed starting material to a mechanical disintegration to provide a powder which can be advantageously used as a solid material for the reaction with fluorine radicals.

The solid material which is reacted with the fluorine radicals as a preferred embodiment of the process in accordance with the second aspect of the invention may be provided, e.g., by irradiating a solid material which contains elemental uranium enriched in the isotope uranium-235 with neutrons. Thus, a solid material comprising elemental uranium and elemental molybdenum is provided wherein the elemental molybdenum comprises the isotope molybdenum-99. In other words, the step of providing a mixture containing $MoF_6$ and $UF_6$ as an initial metal fluoride mixture may comprise irradiating a solid material which contains elemental uranium enriched in the isotope uranium-235 with neutrons to obtain a solid material comprising elemental uranium and elemental molybdenum, and wherein the elemental molybdenum comprises the isotope molybdenum-99. Established procedures for generating molybdenum-99 by the fission of uranium-235 via irradiation with neutrons can be relied on in this regard.

Alternatively, the solid material which is reacted with the fluorine radicals as a preferred embodiment of the process in accordance with the second aspect of the invention may be provided by preparing an alloy comprising elemental uranium enriched in the isotope uranium-235 and non-radioactive molybdenum. Thus, a solid material comprising elemental uranium enriched in uranium-235 and molybdenum is obtained, which may be used e.g. as a U-Mo fuel.

As referred to herein, uranium enriched in the isotope uranium-235 typically contains the uranium-235 in an amount of up to 50 wt % (based on the total weight of uranium as 100 wt %.

The step of providing a gas phase mixture containing $MoF_6$ and $UF_6$ may further comprise, prior to the reaction of the solid material with fluorine radicals, a reaction of the solid material with hydrogen radicals to obtain a solid material comprising $UH_3$; and the reconversion of $UH_3$ to elemental uranium by subjecting the $UH_3$ to an increased temperature. This reaction with hydrogen radicals may be particularly advantageous for a solid material obtained by irradiating a solid material which contains elemental uranium enriched in the isotope uranium-235 with neutrons.

If, in accordance with the preferred embodiment discussed above, the solid material comprising elemental uranium and elemental molybdenum is obtained by irradiating a solid material which contains elemental uranium enriched in the isotope uranium-235 with neutrons, the solid material may be reacted with hydrogen radicals to fully or partially convert the uranium to $UH_3$. Accordingly, the reaction with hydrogen radicals would be carried out prior to the reaction with fluorine radicals. The molybdenum contained in the solid material does not react with hydrogen. Such a preliminary reaction with hydrogen radicals to form $UH_3$ may be useful, e.g., to fully or partially disintegrate the metal matrix of a solid material comprising uranium which has been irradiated with neutrons, and wherein gaseous side products, in particular Kr and Xe, may be formed during the irradiation. Such gaseous side products can be conveniently set free and be removed after the conversion to $UH_3$. Also prior to the reaction of the solid material with fluorine radicals, the $UH_3$ would be reconverted to elemental uranium. This can be accomplished, e.g., subjecting the $UH_3$ to an increased temperature, typically under a vacuum or in an inert atmosphere. The temperature is preferably in the range of 250° C. and 500° C., more preferably at 350° C.

Prior to subjecting the solid material which contains elemental uranium and elemental molybdenum to a reaction with the fluorine radicals, its surface may be cleaned, if needed e.g. to remove metal oxides. This can be accomplished, for example, using a mineral acid such as nitric acid.

The fluorine radicals which are reacted with the solid material containing elemental uranium and elemental molybdenum in accordance with the above embodiment are preferably generated from a fluorine containing precursor compound in a plasma source, more preferably in a remote plasma source. Thus, the step of providing a gas phase mixture containing $MoF_6$ and $UF_6$ preferably comprises generating fluorine radicals in a plasma source, more preferably in a remote plasma source.

In a plasma source, fluorine radicals are generated by supplying energy to a fluorine containing precursor compound so as to dissociate a bond formed with a fluorine atom in the precursor compound. Fluorine containing precursor compounds are typically gaseous compounds. Known precursor compounds, which can also be used in the context of the present invention, include for example any one of $F_2$, $NF_3$, $SF_6$ and $CF_4$. Among them, $F_2$ and $NF_3$ are preferred, and $NF_3$ is particularly preferred due to its reduced corrosivity and its reduced toxicity compared to $F_2$.

In the plasma source, the plasma can be generated e.g. using microwave radiation. Commercially available plasma sources may be used for this purpose. The radiation frequency can be suitably adjusted, e.g. depending on the fluorine containing precursor compound used, to achieve a high degree of dissociation.

The preferred use of a remote plasma source allows the reaction between the fluorine radicals and the solid material containing elemental uranium and elemental molybdenum to take place at a location which is remote from the actual plasma source. Thus, the control of the reaction is facilitated.

As noted above, the reaction of the solid material with fluorine radicals comprises exposing the solid material to a gas flow which comprises the fluorine radicals. The gas flow may further comprise a carrier gas. Typically, the carrier gas is a noble gas such as argon.

Typically, the gas flow which comprises the fluorine radicals is provided by directing a gas flow comprising a gaseous fluorine containing precursor compound and preferably a carrier gas such as argon into a plasma source, preferably a remote plasma source. The solid material containing elemental uranium and elemental molybdenum can then be exposed to the gas flow comprising the fluorine radicals generated by the plasma source, and preferably comprising the carrier gas. It will be understood that the gas flow to which the solid material is exposed may also comprise residual precursor compound.

Thus, the composition of the gas flow can be conveniently controlled by controlling the mass flow of a fluorine containing precursor compound and of the optional carrier gas into the plasma source. Typically, volume ratios of the fluorine containing precursor compound to the optional carrier gas are adjusted in the range of 10:1 to 1:10, preferably 2:1 to 1:2, more preferably 1:1.

For example, the mass flow of the fluorine containing precursor compound into the plasma source can be adjusted to values in the range of 10 to 50 sccm, preferably 15 to 35 sccm. The flow of the optional carrier gas can be adjusted accordingly, taking into account the above typical/preferred volume ratios. As will be understood by the skilled reader, the standardized volumes are indicated on the basis of a temperature of 0° C. and a pressure of 1013.25 hPa.

If a carrier gas, in particular a noble gas such as argon is present in the gas flow, it is advantageous to generate the fluorine radicals in a plasma which burns in the direct environment of the substrate and thereby facilitate the reaction of the metals with the fluorine atoms.

The plasma may be ignited and maintained by commonly used methods such as direct current (DC), high frequency (HF) or microwave radiation, or by a combination of any of these methods. When a suitable substrate potential with respect to plasma and floating potential is additionally applied to the solid material to be reacted with the fluorine radicals, plasma species are accelerated to the surface of the solid material. Thus, electrons allow the localized and directed heating of the solid material, whereas the ion bombardment leads to an ejection of the atoms of the solid material, which can additionally enhance the reaction with the fluorine radicals.

As will be understood by the skilled person, the fluorine radicals are typically provided and the reaction of the solid material with the fluorine radicals is typically carried out in a reaction system which can be evacuated and which is suitable for the introduction of a controlled gas flow at pressures below atmospheric pressure. An exemplary setup of a suitable reaction system is illustrated schematically in FIG. 1.

The pressure inside a reaction system wherein the reaction of the solid material with the fluorine radicals takes place can be controlled by the selected mass flow of the gases, preferably gases consisting of the fluorine gas containing precursor and optionally a carrier gas such as argon.

Typically, the pressure inside the reactor wherein the solid material which contains elemental uranium and elemental molybdenum is reacted with fluorine radicals is in the range of 10 Pa to 3000 Pa, preferably in the range of 10 Pa to 2000 Pa.

The reaction of the solid material which contains elemental uranium and elemental molybdenum with the fluorine radicals proceeds without a need to heat the solid material. However, due to the exothermic nature of the reaction, heat may be generated, and may be controlled e.g. by adjusting the velocity of the gas flow and/or the concentration of the fluorine radicals contained therein.

It will also be understood by the skilled person that the reaction chamber, wherein the solid material is provided for a reaction with the fluorine radicals, should be inert to the fluorine radicals. For example, the reaction chamber may have a surface of passivated nickel or of Monel metal. Due to the high reactivity of fluorine radicals, the distance between the plasma source and the solid material in the reactor should be kept short, even if a remote plasma source is used. Thereby, the loss of fluorine radicals due to volume and surface recombination can be minimized.

If the step of providing a gas phase mixture containing $MoF_6$ and $UF_6$ comprises the reaction of the solid material with hydrogen radicals to obtain a solid material comprising $UH_3$ and the reconversion to elemental uranium, this reaction/reconversion can be carried out as a preliminary reaction in the same reaction system in which the reaction with the fluorine radicals would be carried out in a subsequent step. In particular, the solid material can be exposed to a gas flow comprising hydrogen radicals, and optionally a carrier gas. The hydrogen radicals are preferably generated in a plasma source, more preferably in a remote plasma source as discussed above. The hydrogen radicals can be generated from a hydrogen containing precursor compound in the plasma source. The hydrogen containing precursor compound may be, e.g., $H_2$.

In line with the above preferred approach, a gas phase mixture containing $MoF_6$ and $UF_6$ mixed in gaseous form may be conveniently provided. The gas phase mixture may further comprise a carrier gas. Typically, the carrier gas, if present, is a noble gas such as argon. For example, when the mixture containing $MoF_6$ and $UF_6$ is provided by exposing a solid material containing uranium and molybdenum to a gas flow comprising the fluorine radicals, the gas flow can be conveniently used following the contact with the solid material to transport the $MoF_6$ and $UF_6$ as gaseous reaction products from the reaction chamber. Due to the relatively low boiling point or sublimation temperature of $MoF_6$ and $UF_6$, respectively, a gas phase mixture containing $MoF_6$ and $UF_6$ is provided at moderate temperatures, such that no specific measures have to be taken to allow the fluorides to enter the gas phase.

Incidentally, the volatility of $MoF_6$ and $UF_6$ is higher than that of many other metal fluorides. Thus, a gas phase mixture containing $MoF_6$ and $UF_6$ can also be conveniently separated from other metal fluorides that may be formed during a reaction of a solid material containing uranium and molybdenum with fluorine radicals. As set out above, the solid material can be provided e.g. by irradiating a solid material which contains elemental uranium enriched in the isotope uranium-235 with neutrons. During the fission process triggered by the irradiation, other metals may be formed as side products. Moreover, the uranium targets may comprise aluminum.

In order to provide the gas phase mixture containing $MoF_6$, $UF_6$ and a fluorine atom scavenger, a mixture of $MoF_6$ and $UF_6$ is typically subsequently combined and mixed with the fluorine atom scavenger. If the mixture of $MoF_6$ and $UF_6$ which is initially formed comprises a carrier gas, the $MoF_6$ and the $UF_6$ may be separated from the carrier gas before they are mixed with the fluorine atom scavenger.

In view of the above, it will be understood that the process in accordance with the second aspect of the invention preferably comprises:

a step of providing a gas phase mixture containing $MoF_6$, $UF_6$ and a fluorine atom scavenger mixed in gaseous form, which step comprises generating fluorine radicals in a plasma source, preferably in a remote plasma source, reacting a solid material containing elemental uranium and elemental molybdenum with the fluorine radicals, wherein the reaction comprises exposing the solid material to a gas flow comprising the fluorine radicals to obtain a gas phase mixture containing $MoF_6$ and $UF_6$ mixed in gaseous form which is subsequently combined and mixed with the fluorine atom scavenger;

a step of irradiating the $UF_6$ in the gas phase mixture in the presence of the fluorine atom scavenger with light having a wavelength in the range of 340 to 410 nm to reduce the $UF_6$ to $UF_5$ and to obtain a mixture comprising $UF_5$ and $MoF_6$; and a step of separating the $UF_5$ and the $Mo F_6$.

The fluorine atom scavenger in gaseous form is preferably selected from CO, $H_2$, Xe and $SO_2$. More preferred are CO or $H_2$. The fluorine atom scavenger may be a single substance or a combination of two or more substances, and it is preferably a single substance.

In the gas phase mixture containing $MoF_6$, $UF_6$ and a fluorine atom scavenger mixed in gaseous form, the fluorine atom scavenger is generally added in a molar excess in relation to the $UF_6$, preferably in a molar amount which is 1.5 times or more the molar amount of the $UF_6$. If required, the irradiation and the reduction of $UF_6$ can be carried out multiple times, i.e. two or more times, to ensure a quantitative conversion of the $UF_6$ to $UF_5$, and fluorine atom scavenger can be replenished to the mixture prior to each repetition of the irradiation and reduction. However, preferably, the process comprises a single step wherein the $UF_6$ is irradiated and reduced in the presence of a sufficient amount of the fluorine atom scavenger.

The light used for the irradiation of the $UF_6$ in the gas phase mixture has a wavelength in the range of 340 to 410 nm, preferably a wavelength in the range of 380 to 400 nm, and most preferably of 395 nm. In this wavelength range, $UF_6$ is efficiently converted to $UF_5$, while $MoF_6$ contained in the solution does not show any significant absorption, and remains unaffected by the light.

Following the conversion of the $UF_6$ to $UF_5$, the reaction product of the fluorine atom scavenger and the fluorine formed by the reduction of the $UF_6$ to $UF_5$ in the gas phase mixture, and optionally remaining fluorine atom scavenger are preferably removed from the produced mixture of $UF_5$ and $MoF_6$. For example, this can be conveniently accomplished by cooling the reaction mixture containing $UF_5$, $MoF_6$ the reaction product of the fluorine atom scavenger and the fluorine formed by the reduction of the $UF_6$ to $UF_5$ in the gas phase mixture, and optionally remaining fluorine atom scavenger to a temperature where $UF_5$ takes a solid form, $MoF_6$ takes a liquid or solid form, and the reaction product of the fluorine atom scavenger and the fluorine formed by the reduction of the $UF_6$ to $UF_5$ can be removed, e.g. by pumping off, in the gas phase.

The $MoF_6$ and the $UF_5$ obtained in the process of the second aspect of the invention can be conveniently separated e.g. by distilling off the $MoF_6$, since $MoF_6$ is a very volatile substance, whereas $UF_5$ is not. A preferred temperature range for distilling the $MoF_6$ is the range of 25 to 100° C. It will be understood that the $MoF_6$ is typically re-condensed such that both $UF_5$ and $MoF_6$ can be separately recovered.

The following items provide a summary of important embodiments of the process in accordance with the second aspect of the invention.

1B. A process comprising
  a step of providing a gas phase mixture containing $MoF_6$, $UF_6$ and a fluorine atom scavenger mixed in gaseous form;
  a step of irradiating the $UF_6$ in the gas phase mixture in the presence of the fluorine atom scavenger with light having a wavelength in the range of 340 to 410 nm to reduce the $UF_6$ to $UF_5$ and to obtain a mixture comprising $UF_5$ and $MoF_6$; and
  a step of separating the $UF_5$ and the $MoF_6$.
2B. The process according to item 1B, wherein the fluorine atom scavenger in gaseous form is selected from CO, $H_2$, Xe and $SO_2$.
3B. The process according to item 1B or 2B, wherein the fluorine atom scavenger is added to the gas phase mixture in a molar amount which is at least 1.5 the molar amount of the $UF_6$ contained in the gas phase mixture.
4B. The process according to any of items 1B to 3B, wherein the light used for irradiation has a wavelength of 380 to 400 nm, more preferably of 395 nm.
5B. The process according to any of items 1B to 4B, which further comprises a step of removing a reaction product of the fluorine atom scavenger and the fluorine formed by the reduction of $UF_6$ to $UF_5$.
6B. The process according to any of items 1B to 5B, wherein the $MoF_6$ and the $UF_5$ obtained in the process are separated by distilling off the $MoF_6$.
7B. The process according to any of items 1B to 6B, wherein the molar ratio of $MoF_6$ to $UF_6$ in the gas phase mixture ranges from 1:400 to 100:1, more preferably from 1:5 to 10:1.
8B. The process according to any of items 1B to 7B, wherein the $MoF_6$ contained in the gas phase mixture comprises the isotope molybdenum-99.
9B. The process according to any of items 1B to 8B, wherein the $UF_6$ contained in the gas phase mixture is enriched in uranium-235.
10B. The process according to any of items 1B to 9B, wherein the step of providing a gas phase mixture containing $MoF_6$, $UF_6$ and a fluorine atom scavenger comprises reacting a solid material, which contains elemental uranium and elemental molybdenum, with fluorine radicals, and wherein the reaction comprises exposing the solid material to a gas flow comprising the fluorine radicals, to obtain the mixture containing $MoF_6$ and $UF_6$.
11B. The process according to item 10B, wherein the step of providing a gas phase mixture containing $MoF_6$, $UF_6$ and a fluorine atom scavenger comprises irradiating a solid material which contains elemental uranium enriched in the isotope uranium-235 with neutrons to obtain a solid material comprising elemental uranium and elemental molybdenum, and wherein the elemental molybdenum comprises the isotope molybdenum-99.
12B. The process according to item 10B or 11B, wherein the solid material comprising elemental uranium and elemental molybdenum comprises the molybdenum at a weight ratio in the range of 0.02 to 1.0 wt %, more preferably 0.05 to 0.2 wt %, based on the total weight of uranium and molybdenum as 100 wt %.
13B. The process according to item 10B, wherein the solid material which contains elemental uranium and elemental molybdenum is a mixture of uranium enriched in the isotope uranium-235 and molybdenum,
14B. The process according to item 13B, wherein the solid material comprising elemental uranium and elemental molybdenum comprises the molybdenum at a weight ratio in the range of 5 to 12 wt %, preferably 7 to 10 wt %, based on the total weight of uranium and molybdenum as 100 wt %.
15B. The process according to any of items 10B to 14B, wherein the step of providing a mixture containing $MoF_6$ and $UF_6$ as an initial metal fluoride mixture comprises generating the fluorine radicals from a fluorine containing precursor compound in a plasma source, more preferably in a remote plasma source.
16B. The process according to item 15B, wherein the fluorine containing precursor compound is selected from $F_2$ and $NF_3$, and is more preferably $NF_3$.
17B. The process according to any of items 10B to 16B, wherein the gas flow further comprises a carrier gas.
18B. The process according to any of items 10B to 17B, wherein the reaction of the solid material with the fluorine radicals is carried out at a pressure in the range of 10 Pa to 3000 Pa.
19B. The process according to any of items 11B to 18B, wherein the step of providing a gas phase mixture containing $MoF_6$, $UF_6$ and a fluorine atom scavenger comprises, prior to the reaction of the solid material with fluorine radicals, irradiating a solid material which contains elemental uranium enriched in the isotope uranium-235 with neutrons and reacting the irradiated solid material with hydrogen radicals to obtain a solid material comprising $UH_3$; and reconverting the $UH_3$ to elemental U by subjecting it to an increased temperature.

20B. The process according to item 19B, wherein the hydrogen radicals are generated from a hydrogen containing precursor compound in a plasma source, more preferably in a remote plasma source.

As noted above, the invention further relates to a process for the provision of a metal fluoride, said metal-fluoride production process comprising the steps of:

generating fluorine radicals from a fluorine-containing precursor compound using a plasma source;

reacting the fluorine radicals with a solid material containing an elemental metal to obtain a metal fluoride or with a solid material containing an elemental semimetal to obtain a semimetal fluoride; and recovering the metal fluoride or semimetal fluoride;

wherein the metal is selected from molybdenum, technetium, ruthenium, rhodium, palladium, tungsten, rhenium, osmium, iridium, platinum, gold and uranium, and the semimetal is tellurium.

The solid material to be reacted with the fluorine radicals contains a metal selected from molybdenum, technetium, ruthenium, rhodium, palladium, tungsten, rhenium, osmium, iridium, platinum, gold and uranium, or tellurium as a semimetal.

In the solid material containing an elemental metal or semimetal, one or more of the elements listed above may be contained. Furthermore, one or more of the elements listed above may be combined in the solid material with another component, e.g. an elemental metal or an elemental semimetal not selected from molybdenum, technetium, ruthenium, rhodium, palladium, tungsten, rhenium, osmium, iridium, platinum, gold, uranium, and tellurium. For example, two elements may be combined in a solid material in the form of a mixture, or in the form of an alloy. It is noted that the reference to an alloy herein encompasses intermetallic phases, to the extent that such a phase is formed by the components of the alloy under consideration. Reference to an alloy also encompasses an alloy formed between one or more metals, e.g. uranium, and one or more semimetals, e.g. silicon.

Preferably, the solid material contains a single elemental metal (i.e. only one elemental metal component is present), and the single metal is selected from molybdenum, technetium, ruthenium, rhodium, palladium, tungsten, rhenium, osmium, iridium, platinum, gold and uranium. The solid material may also consist of a single elemental metal.

Preferably, the elemental metal is selected from molybdenum, ruthenium, rhodium, tungsten, rhenium, osmium, iridium, platinum and uranium.

The form in which the solid material is subjected to a reaction with the fluorine radicals is not particularly limited. The solid material may have a compact shape, e.g. a regular compact shape such as a plate, a cylinder or a sphere. The solid material may also be reacted with the fluorine radicals in the form of a powder.

Prior to subjecting the solid material to a reaction with the fluorine radicals, its surface may be cleaned, if needed e.g. to remove metal oxides. This can be accomplished, for example, using a mineral acid such as nitric acid. A potential oxide layer on the platinum metals, on tungsten or on molybdenum may also be removed by exposing the material to hydrogen radicals before the fluorination process. The hydrogen radicals are generated from hydrogen gas using a plasma source, more preferably a remote plasma source.

The fluorine radicals which are reacted with the solid material are generated from a fluorine containing precursor compound using a plasma source, more preferably in a remote plasma source.

In a plasma source, fluorine radicals are generated by supplying energy to a fluorine containing precursor compound so as to dissociate a bond formed with a fluorine atom in the precursor compound. Fluorine containing precursor compounds are typically gaseous compounds. Known precursor compounds, which can also be used in the context of the metal-fluoride production process in accordance with the present invention, include for example any one of $F_2$, $NF_3$, $SF_6$ and $CF_4$. Among them, $F_2$ and $NF_3$ are preferred, and $NF_3$ is particularly preferred due to its reduced corrosivity and its reduced toxicity compared to $F_2$.

In the plasma source, the plasma can be generated e.g. using microwave radiation. Commercially available plasma sources may be used for this purpose. The radiation frequency can be suitably adjusted, e.g. depending on the precursor compound used, to achieve a high degree of dissociation.

The preferred use of a remote plasma source allows the reaction between the fluorine radicals and the solid material containing the elemental metal to take place at a location which is remote from the actual plasma source. Thus, the control of the reaction is facilitated.

The reaction of the fluorine radicals with the solid material containing the elemental metal typically comprises exposing the solid material to a gas flow which comprises the fluorine radicals. The gas flow may further comprise a carrier gas. Typically, the carrier gas is a noble gas such as argon.

Typically, the gas flow which comprises the fluorine radicals is provided by directing a gas flow comprising a gaseous fluorine containing precursor compound and preferably a carrier gas such as argon into a plasma source, preferably a remote plasma source. The solid material containing the elemental metal can then be exposed to the gas flow comprising the fluorine radicals generated by the plasma source, and preferably comprising the carrier gas. It will be understood that the gas flow to which the solid material is exposed may also comprise residual precursor compound.

Thus, the composition of the gas flow can be conveniently controlled by controlling the mass flow of a fluorine containing precursor compound and of the optional carrier gas into the plasma source. Typically, volume ratios of the fluorine containing precursor compound to the optional carrier gas are adjusted in the range of 10:1 to 1:10.

For example, the mass flow of the fluorine containing precursor compound into the plasma source can be adjusted to values in the range of 1 to 100 sccm. The mass flow of the carrier gas, if used, is preferably in the range of 1 to 150 sccm. As will be understood by the skilled reader, the standardized volumes are indicated on the basis of a temperature of 0° C. and a pressure of 1013.25 hPa.

If a carrier gas, in particular a noble gas such as argon is present in the gas flow, it is advantageous to generate the fluorine radicals in a plasma which burns in the direct environment of the substrate and thereby facilitate the reaction of the metals with the fluorine atoms.

The plasma may be ignited and maintained by commonly used methods such as direct current (DC), high frequency (HF) or microwave radiation, or by a combination of any of these methods. When a suitable substrate potential with respect to plasma and floating potential is additionally applied to the solid material to be reacted with the fluorine radicals, plasma species are accelerated to the surface of the solid material. Thus, electrons allow the localized and directed heating of the solid material, whereas the ion bombardment leads to an ejection of the atoms of the solid material, which can additionally enhance the reaction with the fluorine radicals.

As will be understood by the skilled person, the fluorine radicals are typically provided and the reaction of the solid material with the fluorine radicals is typically carried out in a reaction system which can be evacuated and which is suitable for the introduction of a controlled gas flow at pressures below atmospheric pressure. An exemplary setup of a suitable reaction system is illustrated schematically in FIG. 1.

The pressure inside a reaction system wherein the reaction of the solid material with the fluorine radicals takes place can be controlled by the selected mass flow of the gases, preferably gases consisting of the fluorine containing precursor compound and optionally a carrier gas such as argon.

Typically, the pressure inside the reactor wherein the solid material is reacted with fluorine radicals is in the range of 10 Pa to 3000 Pa, preferably in the range of 10 Pa to 2000 Pa.

The reaction of the solid material with the fluorine radicals may proceed without a need to heat the solid material, but it is also possible to heat the solid material, where desired, e.g. to accelerate the reaction. Since the reaction with some metals may proceed under generation of heat, it may be desirable to control the reaction e.g. by adjusting the velocity of the gas flow and/or the concentration of the fluorine radicals contained therein.

It will also be understood by the skilled person that the reaction chamber, wherein the solid material is provided for a reaction with the fluorine radicals, should be inert to the fluorine radicals. For example, the reaction chamber may have a surface of passivated nickel or of Monet metal. Due to the high reactivity of fluorine radicals, the distance between the plasma source and the solid material in the reactor should be kept short, even if a remote plasma source is used. Thereby, the loss of fluorine radicals due to volume and surface recombination can be minimized.

The metal fluoride obtained from the reaction may be recovered from the reactor after the completion of the reaction. Depending on the vapor pressure of the metal fluoride it can also be possible to recover the metal fluoride from the gas phase. For example, when the reaction of the fluorine radicals and the solid material is carried out by exposing the solid material to a gas flow comprising the fluorine radicals, the gas flow can be conveniently used following the contact with the solid material to transport the metal fluoride as gaseous reaction product from the reaction chamber. Subsequently, the metal fluoride can be recovered from the gas phase e.g. by cooling the gas phase to an appropriate temperature where the metal fluoride is deposited.

The structure of the metal fluoride which is obtained by the reaction depends on the type of metal which is reacted with the fluorine radicals. As will be appreciated, when the solid material reacted with the fluorine radicals comprises molybdenum, the recovered metal fluoride comprises molybdenum fluoride, i.e. for each of the elemental metals or the elemental semimetal selected from molybdenum, technetium, ruthenium, rhodium, palladium, tungsten, rhenium, osmium, iridium, platinum, gold, uranium and tellurium present in the solid material, the corresponding metal or semimetal fluoride will be formed by the reaction. The following table provides an overview over the metals and the fluorides which can be obtained by their reaction with fluorine radicals using the metal fluoride production process in accordance with the present invention.

| Metal | Obtainable metal fluoride |
| --- | --- |
| Mo | $MoF_6$ |
| Te | $TeF_6$ |
| Ru | $RuF_5$ |
|  | $RuF_6$ |
| Rh | $RhF_3$ |
|  | $RhF_6$ |
| Pd | $PdF_6$ |
| W | $WF_6$ |
| Re | $ReF_6$ |
|  | $ReF_7$ |
| Os | $OsF_6$ |
| Ir | $IrF_6$ |
| Pt | $PtF_4$ |
|  | $PtF_6$ |
| Au | $AuF_3$ |
|  | $AuF_5$ |
| U | $UF_6$ |

The following items provide a summary of important embodiments of the metal fluoride production process in accordance with the present invention.

1C. A process for the provision of a metal fluoride, said process comprising the steps of:
generating fluorine radicals from a fluorine containing precursor compound using a plasma source;
reacting the fluorine radicals with a solid material containing an elemental metal to obtain a metal fluoride or with a solid material containing an elemental semimetal to obtain a metal fluoride or semimetal fluoride; and
recovering the metal fluoride;
wherein the metal is selected from molybdenum, technetium, ruthenium, rhodium, palladium, tungsten, rhenium, osmium, iridium, platinum, gold and uranium, and the semimetal is tellurium.

2C. The process according to item 1C, wherein the solid material comprises a single elemental metal, and wherein the metal is selected from molybdenum, technetium, ruthenium, rhodium, palladium, tungsten, rhenium, osmium, iridium, platinum, gold and uranium.

3C. The process according to item 1C or 2C, wherein the metal is selected from molybdenum, ruthenium, rhodium, tungsten, rhenium, osmium, iridium, platinum and uranium.

4C. The process according to any one of items 1C to 3C, wherein the plasma source is a remote plasma source.

5C. The process according to any one of items 1C to 4C, wherein the fluorine containing precursor compound is selected from $NF_3$, $F_2$, $SF_6$ and $CF_4$.

6C. The process according to item 5C, wherein the fluorine containing precursor compound is $NF_3$.

7C. The process according to any one of items 10 to 6C, wherein the reaction of the fluorine radicals with a solid material containing an elemental metal comprises exposing the solid material to a gas flow which comprises the fluorine radicals.

FIG. 1 shows a schematic representation of an exemplary reaction system which may be used to accomplish the reaction of a solid material with fluorine radicals in the context of the two aspects of the invention. Provided gases are the fluorine-containing precursor compound (1), hydrogen (optional, (2)) and the carrier (noble) gas (optional (3)). The composition of the gas flow can be regulated by the mass flow controllers (4), one for argon (optional), hydrogen (optional) and the fluorine containing precursor compound. The process gas reaches the remote plasma source (5), where fluorine radicals are generated. Optionally, hydrogen radicals can be generated before the reaction in order to hydrogenate a potential oxide layer on the platinum metals, on molybdenum or on tungsten. The fluorination takes place in the reaction tube (7), which can be heated with an oven (6). The reaction product can be deposited in the subsequent cold traps and can be removed via extraction ports situated behind each cold trap. Subsequently to the cold traps, two fluorine absorbers (8) can be located, which bind unconsumed reactive fluorine species and thereby protect the pumping unit (9).

EXAMPLES

Example 1—Preparation of a Mixture or Uranium Fluoride and Molybdenum Fluoride a) Reaction System for the Preparation of Uranium and Molybdenum Fluorides A mixture of $UF_6$ and $MoF_6$ was prepared using the reaction system which is schematically illustrated by the flow chart in FIG. 1.

The system (hereafter referred to as fluorination line) consists of the following subsystems: The gas supply (1), (2), (3), (4), the remote plasma source (RPS, (5)), the reaction tube (6), (7), the pipelines and cold traps, the absorption system (8) and the pumping station (9). In addition, several peripheral devices facilitate the regulation of the process. These include control units for the mass flow controllers (MFC), the readout device for the pressure sensors, the control unit for the oven, the power supply for the microwave as well as PC, keyboard and screen, which is necessary to operate the control software for the RPS. The wiring of the system is housed in a separate control cabinet.

The use of three MFCs (4) allows the control of the gas flow rate and thus the exact composition of the process gas. The process gas is fed into the RPS (5), where fluorine, hydrogen and oxygen radicals are formed, depending on its exact composition. The (optional) use of oxygen allows the synthesis of oxyfluorides, whereas the (optional) use of hydrogen allows a removal of potential oxide layers on the substrate.

The actual fluorination takes place in the heatable reaction tube (7). The cold traps are located downstream and allow the deposition of the reaction product. Thereby, the use of the last cold trap as a "getter trap" has itself proven to be advantageous in order to remove residues and impurities from the system. Further downstream the fluorine absorbers (8) are located, which preferably bind unconsumed reactive fluorine species and thereby protect the subsequent pumps (9).

The use of a Remote Plasma Source advantageously allows the fluorides to be synthesized in a low vacuum. Thus, the use of autoclaves, elevated pressure and/or high temperatures is not necessary.

Gas Supply with MFCs

The supply with process gases is controlled by three MFCs (mass flow controllers) manufactured by the Bronkhorst Company. These are driven over an RS232 interface with the Readout and Control System E-8501-0-2A, likewise of the Bronkhorst Company. The MFCs are also equipped with an EtherCAT port. The readout of the pressure takes place by two capacitive sensors CERAVAC Transmitter CTR100N of Oerlikon Leybold with a maximum pressure range of 100 Torr and 10 Torr, respectively. Thereby, the 100 Torr sensor is located directly subsequent to the RPS, whereas the 10 Torr sensor is located downstream of the third cold trap. The usage of capacitive sensors holds the advantage of their independence of the applied gas.

MFC 1 supplies the RPS with the fluorine containing process gas (fluorine containing precursor compound). In this example $NF_3$ has been used, but the setup also allows the use of other process gases. In order to ensure a high life time, MFC 1 is equipped with FFKM (Kalrez) gaskets.

MFC 2 supplies the RPS with Argon, which can be used as a carrier gas and/or for purging the line after the fluorination process and to ensure a counter flow when opening the extraction ports (minimizing the intrusion of oxygen and moisture). The gaskets of MFC 2 are made of Viton.

MFC 3 supplies the line with either oxygen (synthesis of oxyfluorides) or hydrogen (removal of potential oxide layers on the substrate), if desired.

Remote Plasma Source (RPS)

The plasma is burning inside the Remote Plasma Source. The plasma is created using microwave radiation with a frequency of 2.45 GHz. The radiation provides the energy to break the fluorine bonds of the fluorine containing process gas (fluorine containing precursor compound). In doing so, a high concentration of fluorine radicals (degree of dissociation greater 95%) can be created, which allows a highly efficient fluorination.

Due to its relatively weak bond, $NF_3$ is advantageously used as the process gas. The RPS is the model MA3000C-193BB of the MUEGGE Company. According to the technical specifications, the model requires high flow rates of the process gas of at least 500 sccm. However, it could be shown during operation that the RPS can be operated safely at much smaller flow rates of as low as 2 sccm. The RPS is powered by the microwave power supply MX3000D-117KL (MPS) with a maximum power output of 3000 W also of the MUEGGE Company. It is controlled via PC, which runs the Windows-based control software. However, the input signal for the MPS is based on CAN bus, so a signal converter is interposed between PC and MPS.

The cooling water monitoring of both components is automated. As soon as the temperature leaves a precisely defined window or the cooling water flow rate becomes too low, an interlock shuts down the MPS. If the pressure of the cooling water exceeds a threshold value, magnet valves at the entry switch of the cooling water in order to protect the system from damage and/or leakage.

Reaction Tube

The actual fluorination takes place in the reaction tube. The reaction tube is made from nickel, which has been passivated before. It is located inside an oven, which can be heated up to 1000° C. Due to the high reactivity of the fluorine radicals, the distance from the plasma to the substrate should be held as short as possible in order to reduce losses because of recombination. Therefore, only a short reducing 4-way cross is located between the RPS and the reaction tube. Here, one of the pressure sensors as well as a viewport equipped with a sapphire glass window on the opposite side are located. The viewport on one hand allows to confirm whether the plasma is burning and on the other side allows a direct evaluation of the reaction process of the substrate Pipelines and Cold Traps with Bypass The pipelines lead from the reaction tube further downstream to the cold traps, in which a deposition can take place.

The pipelines are made from stainless steel 1.4404 with a diameter of ½ inch. All of the valves used are membrane valves of the type 6L-ELD8-77X-P of the Swagelok Company. These valves are hallmarked by a high corrosion resistance.

The cold traps are made from PFA and feature a simple U-tube design. They are being passivated before use at a pressure of 1 bar for 24 hours with pure fluorine in order to remove non-fluorinated constituents and thereby to guarantee the chemical inertness of the material. Each cold trap can be bypassed. This allows the purging of the system before the resublimation process with Argon on one hand and on the other hand switching to another could trap, if the deposited product negatively affects the gas flow rate leading to an increased pressure. In addition, it has proven useful to utilize the cold trap furthest downstream as a "getter trap" in order to remove residues and residual humidity, which is left after heating and evacuation in the system and thereby to further increase the purity of the synthesized products.

Absorption System

The absorption system consists of two tubes made of stainless steel 1.4435 filled with a fluorine absorber. This can be Soda lime, $Al_2O_3$ or $TiO_2$. They protect the pumping unit from non-deposited reactive fluorine species. The absorber tubes are connected with valves in a way that they can be used either in row or that the front tube can be bypassed. Three thermocouples on each tube allow the monitoring of the reaction front. Thereby, they allow measuring the level of exhaustion of the absorber material. The absorber tubes are connected to the line via DN 40 CF flanges.

Pumping Unit

As pumping system, a rotary vane pump TRIVAC D40BCS with PTFE oil of the Leybold Company was used as the first stage, boosted with a roots pump RUVAC WSU 251 as a second stage. On this stage, a SECUVAC valve is placed, which automatically vents the pumps and shuts off the system on the vacuum side, when the rotary vane pump is switched off. The rotary vane pump is equipped with chemical filter CFS 40-65, which consists of porous $Al_2O_3$ and removes residues from the oil. It is also equipped with the exhaust filter with lubricant return ARS 40-65.

Synthesis Product Extraction

The synthesis product is extracted from the cold traps by recondensing it into sample cylinders. These cylinders are equipped with a membrane valve and connected to the extraction ports. The sample cylinder is cooled with liquid nitrogen, whereas the cooling agent of the cold traps is removed at the same time. This recondensing step increases the purity of the synthesis product even more.

b) Preparation of $UF_6$ and $MoF_6$

Using the reaction system described above, a mixture containing $UF_6$ and $MoF_6$ was provided in line with the following protocol.

Cleaning of a metal substrate comprising 99 wt % U and 1 wt % Mo with 7 M $HNO_3$ in order to remove oxide layer, afterwards removal of $HNO_3$ with aqua dest. and acetone (total weight after cleaning: 1504.8 mg).

Placing substrate on Monel carrier and inserting it at argon counterflow into the reaction chamber.

Purging the entire system three times with argon and evacuating afterwards in order to remove any oxygen or humidity which entered the system during the introduction of the carrier and substrate. During the purging process, the absorbers are bypassed in order to avoid unnecessary dust of the absorber material accumulate in the downstream valves.

Filling the Dewar vessels of the cold traps with the different frigorific mixtures (in the last experiments isopropanol-dry ice at a temperature of −82° C. for cold trap 1, isopropanol-dry ice at a temperature of −85° C. for cold trap 2 and liquid nitrogen at a temperature of −190° C. for the third cold trap)

Closing all MFC bypass valves.

Closing all bypass valves of the cold traps

Closing the bypass of the absorber and open the absorber valves

Switching on the cooling water for the RPS (Remote Plasma Source) and the MPS (Microwave Power Supply), checking that it exceeds 4 l/min Setting the value for the Ar MFCs at the MFC Control Panel to 20 sccm Starting the RPS at the control computer, setting it to 3000 W Setting the value for the $NF_3$ MFCs at the MFC Control Panel to 20 sccm Controlling through the sapphire window, whether the plasma ignited correctly Fluorination over 45 minutes until the target is dissolved (controlled through the sapphire glass window)

Pressure sensor 1: between 3.70 (start of process) and 4.15 mbar (end of process)

Pressure sensor 2: between 3.04 (start of process) and 3.28 mbar (end of process)

Maximum Temperature of the reaction chamber 74.6° C. (no forced cooling of the tube required)

Shutting off the cold traps by closing their valves

Removing the frigorific mixtures and letting the fluorides in the cold traps heat up Extracting the fluorides via the extraction ports and transferring them into a FEP tube cooled with liquid nitrogen. The highest concentration of $MoF_6$ is in cold trap 3 and therefore will be extracted via port 3.

The amount of $MoF_6$ recovered from cold trap 3 accounts to about 35% of the total amount of $MoF_6$ produced during the reaction and has been enriched from 1:99 to 3:2 (mass ratio of $MoF_6$ to $UF_6$). Another 20% of the $MoF_6$ were deposited in cold trap 1. The amount of $UF_6$, which has been recovered, was not recorded.

Example 2—Gas-Phase Separation with UV Light Using CO as Fluorine Scavenger

A 1:1 (weight) mixture of $UF_6$ and $MoF_6$ was placed into a quartz vessel. Onto this mixture, about 100 kPa (1 bar) of CO (gaseous) was added and the $UF_6$/$MoF_6$/CO mixture was irradiated with ultraviolet light having a wavelength of 395 nm for 12 hours. The following reactions takes place:

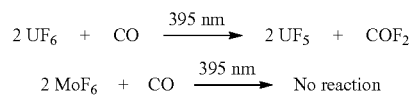

After 12 hours of irradiation, the reaction mixture was cooled using liquid nitrogen (−196° C.) and the volatile $COF_2$ was pumped off. An additional 100 kPa (1 bar) of CO (gaseous) was added to the quartz vessel and the mixture was irradiated again with 395 nm light for an additional 12-24 hours.

After this additional irradiation cycle, the reaction mixture was cooled to −196° C. and the volatile COF$_2$ was pumped off. A mixture of UF$_5$ (solid, non-volatile) and MoF$_6$ (liquid, volatile) remained. The MoF$_6$ was then be separated from the UF$_5$ via distillation. Both UF$_5$ and MoF$_6$ are collected in quantitative amounts at the end of the separation. Analysis with MP-AES (microwave plasma atomic emission spectroscopy) showed the molybdenum sample to be pure, with no detectable amounts of uranium. Analysis of the UF$_5$ sample showed that over 99% of the molybdenum had been removed.

Similarly, this reaction can be done using hydrogen gas (H$_2$). The separation was done in the same way as the CO separation, except the corresponding reactions are:

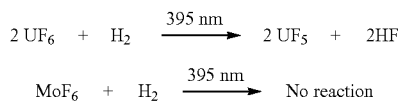

$$2 \text{UF}_6 + \text{H}_2 \xrightarrow{395 \text{ nm}} 2 \text{UF}_5 + 2\text{HF}$$

$$\text{MoF}_6 + \text{H}_2 \xrightarrow{395 \text{ nm}} \text{No reaction}$$

However, attention must be paid to choosing an appropriate reaction vessel. Quartz should not be used because it will react with the HF gas formed. Perfluorinated plastic is also not recommended due to the solubility of MoF$_6$ in such plastics.

Procedures 1. 200 mg UF$_6$ and 200 mg of MoF$_6$ were distilled into a quartz vessel (which was previously flame dried; the volume of the quartz vessel was approximately 30 mL).
2. 100 kPa (1 bar) of CO (gas) was added to the vessel.
3. The UF$_6$/MoF$_6$/CO mixture was irradiated with 395 nm light for about 12 hours.
4. The mixture was cooled to −196° C. (using liquid nitrogen) and the volatile COF$_2$ was pumped off.
5. 100 kPa (1 bar) of fresh CO was placed into the vessel and the mixture was irradiated again with 395 nm light for an additional 12 to 24 hours.
6. The mixture was cooled to −196° C. and the remaining CO and COF$_2$ were pumped off. A mixture of MoF$_6$ (liquid, volatile) and UF$_5$ (solid, non-volatile) was left.
7. The MoF$_6$ was then distilled to a new quartz vessel.
8. MP-AES analysis was performed on the molybdenum-containing (MoF$_6$, read below) and uranium-containing (UF$_5$) samples to check for purity.

To allow for easier handling of the MoF$_6$ sample for MP-AES measurements, the MoF$_6$ was reduced to MoF$_5$ by light with a wavelength of 252 nm using the following reaction:

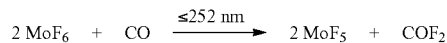

$$2 \text{MoF}_6 + \text{CO} \xrightarrow{\leq 252 \text{ nm}} 2 \text{MoF}_5 + \text{COF}_2$$

The results of the MP-AES measurements for the uranium-containing (UF$_5$) sample can be found in Table 1. The results of the MP-AES measurements for the molybdenum-containing (MoF$_6$) sample can be found in Table 2.

Results

TABLE 1

MP-AES results of the uranium sample (UF$_5$) obtained after the UV separation of MoF$_6$ from UF$_6$ using 395 nm light and carbon monoxide. All trials were measured in triplicates.

| | Trial 1 (U) | Trial 2 (U) | Trial 3 (U) |
|---|---|---|---|
| Mo, mg/L | 0.16 ± 0.01 | 0.16 ± 0.01 | 0.13 ± 0.00 |
| % Mo | 0.30 ± 0.01 | 0.32 ± 0.01 | 0.26 ± 0.00 |
| U, mg/L | 39.31 ± 2.27 | 35.62 ± 0.77 | 35.52 ± 0.95 |
| % U | 73.52 ± 1.41 | 68.61 ± 1.70 | 68.89 ± 1.05 |
| Mo/U ratio before separation | 1.70 | 1.63 | 1.61 |
| Mo/U ratio after separation | 0.01 ± 0.00 | 0.01 ± 0.00 | 0.01 ± 0.00 |
| % Mo removed | 99.41 ± 0.02 | 99.30 ± 0.03 | 99.42 ± 0.01 |

Table 1 shows the analysis of the UF$_5$ sample obtained after the gas phase separation using CO as fluorine scavenger. The separation was performed three times, Trials 1-Trail 3. The measurements were run in triplicates and an average value of the results is reported along with standard deviations. The amount of Mo is reported, along with its percentage in the sample. Similarly, the amount of U is reported along with its percentage in the sample. The Mo/U ratios before and after separation are given, along with the % of Mo removed.

TABLE 2

MP-AES results of the molybdenum sample obtained after the UV separation of MoF$_6$ from UF$_6$ using 395 nm light and carbon monoxide. A single sample was prepared for each trial.

| | Trial 1 (Mo) | Trial 2 (Mo) | Trial 3 (Mo) |
|---|---|---|---|
| Mo, mg/L | 29.14 | 26.29 | 28.95 |
| % Mo | 39.99 | 36.34 | 40.02 |
| U, mg/L | n.d. | n.d. | n.d. | n.d. = not detected

Table 2 shows the analysis of the MoF$_5$ sample obtained after the gaseous CO separation. The Trials 1-3 listed in Table 2 correspond to Trials 1-3 listed in Table 1. The entire MoF$_5$ sample was dissolved for the MP-AES measurement, therefore, only one sample was prepared for each measurement. Reported are the amounts of Mo found in the sample along with the percentage of Mo. Uranium was not detected.

Example 3—Separation Using Liquid Sulfur Dioxide (SO$_2$) with UV Light

A 1:1 (weight) mixture of UF$_6$ and MoF$_6$ was placed in an FEP or PFA reaction vessel. Onto this mixture, 3-5 mL of SO$_2$ (liquid) were distilled. The reaction mixture was then irradiated with 395 nm light. Irradiation time can be suitable selected, depending on how much UF$_6$ is present in the sample. With 200 mg UF$_6$, an irradiation time of 1 hour and 30 minutes was more than sufficient. The separation of MoF$_6$ from UF$_6$ is achieved through the following reactions/conditions:

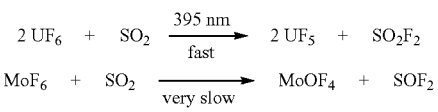

$$2 \text{UF}_6 + \text{SO}_2 \xrightarrow[\text{fast}]{395 \text{ nm}} 2 \text{UF}_5 + \text{SO}_2\text{F}_2$$

$$\text{MoF}_6 + \text{SO}_2 \xrightarrow{\text{very slow}} \text{MoOF}_4 + \text{SOF}_2$$

Since $MoF_6$ is not affected by UV light of this wavelength (395 nm) and because its reaction with $SO_2$ is so slow, after irradiation a mixture of $UF_5$ (solid, non-volatile), $MoF_6$ (liquid, dissolved, volatile), $SO_2$ (liquid, volatile) and $SO_2F_2$ (gas, volatile) was obtained. $MoF_6$ and the remaining $SO_2$+$SO_2F_2$ were removed from $UF_5$ through distillation. $MoF_6$ may be extracted from the $SO_2$ solution after a few days (4 to 7 days) as solid $MoOF_4$, generated by the reaction of $MoF_6$ with $SO_2$ described above.

Analysis of the $MoOF_4$ sample using MP-AES showed no detectable amounts of uranium. Measurement of the $UF_5$ sample showed that more than 99% of the molybdenum had been removed.

Procedures
1. 200 mg $UF_6$ and 200 mg $MoF_6$ were distilled into an FEP or PFA reaction vessel. The reaction vessel contained a 1 cm stir bar coated with PTFE.
2. About 3-5 mL of $SO_2$ were distilled into the reaction vessel using liquid nitrogen as a cooling agent.
3. The reaction mixture was warmed to room temperature and stirred using a stir plate to ensure complete solution of $MoF_6$ and $UF_6$ in $SO_2$.
4. Under constant stirring, the sample was irradiated with 395 nm light for 1 hour and 30 minutes.
5. After irradiation, a mixture of $UF_5$ (solid, non-volatile), $MoF_6$ (liquid, dissolved, volatile), $SO_2$ (liquid, solvent, volatile), and $SO_2F_2$ (gaseous, somewhat dissolved, volatile) was obtained.
6. The $MoF_6$ was removed by distilling all volatile compounds ($MoF_6$, $SO_2$, and $SO_2F_2$) into a new FEP or PFA reaction vessel.
7. Molybdenum can then be extracted from the $SO_2$ solution ($SO_2/SO_2F_2$ mixture) by allowing the $MoF_6$ to completely react with the $SO_2$ solvent to form $MoOF_4$, see equation below.

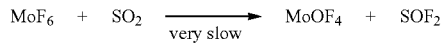

$$MoF_6 + SO_2 \xrightarrow{\text{very slow}} MoOF_4 + SOF_2$$

This reaction is slow and takes about a week.

8. After one week, the $MoOF_4$ is extracted by pumping off the $SO_2$ solution.
9. MP-AES analysis was preformed on the uranium-containing ($UF_5$) and molybdenum-containing ($MoOF_4$) samples.
    Results for the MP-AES analysis of the uranium-containing ($UF_5$) sample are given in Table 3. Results for the MP-AES analysis of the molybdenum-containing ($MoOF_4$) sample are given in Table 4.

Results

TABLE 3

MP-AES results of the uranium sample ($UF_5$) obtained after the $SO_2$/UV separation of $MoF_6$ from $UF_6$ using 395 nm light and $SO_2$ as a solvent. All trials were measured in triplicates.

|  | Trial 4 (U) | Trial 5 (U) | Trial 6 (U) |
|---|---|---|---|
| mg Mo/L | 0.08 ± 0.00 | 0.28 ± 0.03 | 0.10 ± 0.01 |
| % Mo | 0.15 ± 0.01 | 0.50 ± 0.02 | 0.17 ± 0.00 |
| mg U/L | 37.44 ± 0.25 | 34.78 ± 2.54 | 36.22 ± 3.77 |
| % U | 73.01 ± 2.35 | 62.82 ± 0.42 | 63.11 ± 0.43 |
| Mo/U ratio before separation | 1.64 | 1.68 | 1.65 |
| Mo/U ratio after separation | 0.01 ± 0.00 | 0.02 ± 0.00 | 0.01 ± 0.00 |
| % Mo removed | 99.69 ± 0.02 | 98.81 ± 0.04 | 99.58 ± 0.01 |

Table 3 shows the analysis of the $UF_5$ sample obtained after the liquid $SO_2$ separation. The separation was performed three times, Trial 4-Trial 6. The measurements were run in triplicates and an average value of the results is reported along with standard deviations. The amount of Mo is reported, along with its percentage in the sample. Similarly, the amount of U is reported along with its percentage in the sample. The Mo/U ratios before and after separation are given, along with the % of Mo removed.

TABLE 4

MP-AES results of the molybdenum sample ($MoOF_4$) obtained after the $SO_2$/UV separation of $MoF_6$ from $UF_6$ using 395 nm light and $SO_2$ as a solvent. All trials were measured in triplicates.

|  | Trial 4 (Mo) | Trial 5 (Mo) | Trial 6 (Mo) |
|---|---|---|---|
| Mo, mg/L | 54.24 ± 2.55 | 55.90 ± 3.71 | 55.92 ± 1.11 |
| % Mo | 54.65 ± 1.23 | 50.59 ± 1.33 | 49.96 ± 0.83 |
| U, mg/L | n.d. | n.d. | n.d. | n.d = not detected

Table 4 shows the analysis of the $MoOF_4$ sample obtained after the liquid $SO_2$ separation. The separation was performed three times, Trial 4-Trial 6, which correspond to Trials 4-6 in Table 3. The measurements were run in triplicates and an average value of the results is reported along with standard deviations. The amount of Mo is reported, along with its percentage in the sample. No uranium was detected in these samples.

Example 4—Separation Using Liquid $SO_2$ with Filtration

A mixture of $UF_5/MoF_5$ can be made from the following reactions (using the indicated wavelength):

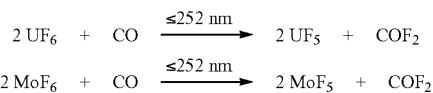

$$2\,UF_6 + CO \xrightarrow{\leq 252\text{ nm}} 2\,UF_5 + COF_2$$

$$2\,MoF_6 + CO \xrightarrow{\leq 252\text{ nm}} 2\,MoF_5 + COF_2$$

This 1:1 (weight) mixture of $UF_5$ and $MoF_5$ was then be separated by placing the mixture into a filtration vessel (a glass H-tube was used, but any appropriate filtration vessel is also suitable). Onto the mixture, 5-10 mL of $SO_2$ (liquid) were distilled. $MoF_5$ is soluble in $SO_2$ while $UF_5$ is insoluble in $SO_2$. Separation was then achieved via filtration through a glass frit. After filtration/separation, analysis of the $MoF_5$ sample showed less than 0.25% uranium to be present. Analysis of the $UF_5$ sample showed the sample to contain about 2% molybdenum. The amount of molybdenum in the $UF_5$ sample is, naturally, dependent on the quality of the filtration and the repetitions of filtration.

Procedures
1. 50 mg $UF_5$ and 50 mg $MoF_5$ were placed in a glass filtration apparatus (an H-tube was used).

2. To this mixture, 5 to 10 mL of $SO_2$ was distilled at −196° C. Afterwards, the mixture was allowed to warm to −30° C. The part of the filtration apparatus containing $UF_5$ was maintained at −30° C. for the duration of the filtration procedure.
3. The solution was manually agitated by shaking the filtration apparatus lightly to dissolve the $MoF_5$ in the $SO_2$ solvent. Solution of $MoF_5$ in $SO_2$ produces a yellow solution. ($SO_2$ alone is colorless)
4. The $SO_2$ solution containing $MoF_5$ was then filtered to the other side of the filtration apparatus via a glass frit.
5. The side of the filtration apparatus was maintained at −30° C. while the side containing the newly filtered $SO2/MoF_5$ solution was allowed to warm. Consequently, the $SO_2$ was slowly distilled back to the original ($UF_5$) side of the filtration apparatus.
6. Steps 4 and 5 were repeated 7 to 10 times, or until the $SO_2$ solution above the $UF_5$ sample remained colorless.
7. The $SO_2$ was distilled out of the filtration apparatus. $MoF_5$ was found on one side of the apparatus while $UF_5$ was found on the other side.
8. The $MoF_5$ and $UF_5$ samples were controlled for purity using micro X-ray fluorescence spectroscopy.

Results are given below. The uranium sample showed about a 2% impurity of molybdenum, while the molybdenum sample showed about a 0.25% impurity of uranium.

Results

| E1 | OZ | Serie | unn. C [Gew. %] | norm. C [Gew. %] | Atom. C [At. %] | Fehler (1 Sigma) [Gew. %] |
|---|---|---|---|---|---|---|
| Mo | 42 | K-Serie | 1.95 | 99.81 | 99.92 | 0.00 |
| U | 92 |  | 0.00 | 0.19 | 0.08 | 0.00 |
| W | 74 | L-Serie | 0.00 | 0.00 | 0.00 | 0.00 |
|  |  | Summe: | 1.95 | 100.00 | 100.00 |  |

The above table shows the results of the micro X-ray fluorescence spectroscopy of the $MoF_5$ sample. This shows less than 0.25% uranium is left in the sample after filtration.

| E1 | OZ | Serie | unn. C [Gew. %] | norm. C [Gew. %] | Atom. C [At. %] | Fehler (1 Sigma) [Gew. %] |
|---|---|---|---|---|---|---|
| U | 92 |  | 16.40 | 97.74 | 94.56 | 0.00 |
| Mo | 42 | K-Serie | 0.38 | 2.26 | 5.44 | 0.00 |
| W | 74 | L-Serie | 0.00 | 0.00 | 0.00 | 0.00 |
|  |  | Summe: | 16.78 | 100.00 | 100.00 |  |

The above table shows the of the micro X-ray fluorescence spectroscopy of the $UF_5$ sample. This shows about 2% of Mo to be left in the sample.

Example 5—Separation Using Supercritical CO

As the critical point of CO is defined by a pressure of 34.5 bar and a temperature of 132.9K, all experiments with supercritical CO were performed in a high-pressure vessel. The pressure hull of the vessel contained a mixture of $UF_6$ and $MoF_6$, which was cooled by a cold finger in its bottom. The bottom itself was sloped in order to ensure that no shaded regions exist, which may not be irradiated. A sapphire window allowed UV light to pass and was sealed to the pressure hull with an FFKM O-ring. The pressure necessary for safe sealing was applied by a steel-lid tightened to the pressure hull with six screws. Both, pressure hull and cold finger have a bore for the insertion of thermocouples for temperature measurement. The pressure hull was wrapped with heating tape to ensure that both $MoF_6$ and $UF_6$ actually condense on the cold finger and not at the walls of the pressure hull.

The high-pressure container was connected via a bellow-sealed valve to a storage container for CO as well as a pressure gauge. Pressure gauge and storage container were also connected via a bellow-sealed valve. A third bellow-sealed valve connected the high-pressure section and a low pressure section. Two storage containers, one for $UF_6$ and one for $MoF_6$, may be connected to one port of the low pressure section. This was done one after another. A measuring cell for IR- and UV/VIS spectroscopy was connected to another extraction port. The pressure in this part of the system was determined by a piezo-resistive pressure sensor. This low-pressure section can be sealed off from the pumps, the argon inlet and the CO inlet by a bellow-sealed valve.

For the experiments, a mixture of $MoF_6$ and $UF_6$ was condensed into the measuring cell and characterized by IR-spectroscopy. Thereby, the exact composition and the ratio of $MoF_6/UF_6$ before the experiment was known. After the spectroscopic analysis, the measuring cell was reconnected to the line and its content resublimated into the high-pressure container, which was cooled with liquid nitrogen at the cold finger to a temperature of −33° C., whereas the wall temperature was held at a temperature of 1° C. via the heating tape. Thereby it was ensured that $MoF_6$ and $UF_6$ only condense at the cold finger. The high-pressure container was subsequently sealed off.

In a next step, dried CO was condensed into a storage container using liquid nitrogen and then heated to room temperature, thereby becoming supercritical. The CO was allowed to enter into the high-pressure container by opening the connecting valve. The pressure gauge showed 56 bar, so the CO in the high-pressure container was in the supercritical state. The high-pressure-container was again sealed off by closing the connecting valve, heated to 20° C. and its content was irradiated for 60 minutes with 395 nm wavelength. During that time, the storage container was evacuated again.

After that time, all constituents which were volatile at room temperature were condensed into a storage container using liquid nitrogen. The storage container was kept at liquid nitrogen temperature and evacuated, removing CO and $COF_2$, but leaving $MoF_6$ and unreacted $UF_6$ in the solid phase. The storage container was then disconnected from the line, vented and filled with water, dissolving $UF_6$ and $MoF_6$ and the solution was analyzed using MP-AES.

The solid residues of the high-pressure chamber (mainly $UF_5$) were dissolved in diluted $HNO_3$ and also measured using MP-AES.

The results are shown in the following table:

|  | Mixture before | Content storage container | Content high-pressure chamber |
|---|---|---|---|
| U [mg] | 26.8 | 2.98 | 20.96 |
| Mo [mg] | 8.5 | 7.35 | 0.08 |

Thus, the uranium content could be reduced by 89% and at the same time, 86% of the molybdenum content could be recovered. What is additionally important is the very small amount of Mo left in the high-pressure chamber, proving MoF$_6$ to be virtually unaffected by the irradiation process.

Example 6—Preparation of OsF$_6$

Using the reaction system described in Example 1, OsF$_6$ was prepared using the following materials and reaction conditions.

Placing osmium powder on Monel carrier (total mass 206.8 mg)
Inserting the substrate under argon counterflow into the reaction chamber
Slowly evacuating the system in order to avoid the powder to be swirled up and slowly flushing it again with argon, repeating this process two more times, last time only evacuating without refilling the chamber with argon
Heating the chamber to 100° C. in order to remove humidity absorbed on the surface of the osmium powder (the increased temperature and low pressure efficiently dry the powder)
Switching off the heating and let the chamber cool down again to about 40° C.
Filling the last Dewar vessel with liquid nitrogen first in order to bind remaining humidity
Setting the value for the Ar MFCs at the MFC Control Panel to 8 sccm
Starting the RPS at the control computer, setting it to 3000 W
Setting the value for the NF$_3$ MFCs at the MFC Control Panel to 2 sccm
Controlling through the sapphire window, whether the plasma ignited correctly
Fluorination for about 75 minutes, after that time the osmium powder is completely consumed
Pressure sensor 1: 1.60 mbar
Pressure sensor 2: 1.242 mbar
Maximum Temperature of the reaction chamber 74.1° C. (no forced cooling of the tube required)
Shutting off the cold traps by closing their valves
Removing the frigorific mixtures and letting the fluorides in the cold traps heat up
Extracting the fluorides via the extraction ports and transferring them into a FEP tube cooled with liquid nitrogen.

Examples 7 to 16

Using similar conditions as set forth in Example 2, except for changes indicated in the table, the metal fluorides listed in the following were prepared:

| Ex. | Metal | obtained Fluoride | Heating of Metal | Mass flow for F containing precursor | mass flow carrier gas | remarks |
|---|---|---|---|---|---|---|
| 7 | Mo | MoF$_6$ | no heating | 35 sccm | 35 sccm | |
| 8 | Ru | RuF$_5$ | 190° C. | 2 sccm | 14 sccm | |
| 9 | Rh | RhF$_3$ RhF$_6$ | | 2 sccm | 8 sccm | for RhF$_6$ rapid cooling necessary |
| 10 | W | WF$_6$ | no heating | 60 sccm | 100 sccm | |
| 11 | Re | ReF$_6$ ReF$_7$ | no heating | 60 sccm | 100 sccm | both substances form simultaneously at the given gas ratios. Separation by cold traps of different temperature possible. |
| 12 | Os | OsF$_6$ | no heating | 2 sccm | 8 sccm | |
| 13 | Ir | IrF$_6$ | no heating (although heating may be beneficial) | 60 sccm | 0 sccm | |
| 14 | Pt | PtF$_4$ PtF$_6$ | no heating | 54 sccm | 10 sccm | Use of nickel/Monel sample holder favored due to atomic fluorine spillover effect; for PtF$_6$ rapid cooling necessary |
| 15 | U | UF$_6$ | no heating | 25 sccm | 25 sccm | |
| 16 | Te | TeF6 | no heating | 8 sccm | 8 sccm | |

Filling the first two Dewar vessels with liquid nitrogen (only cold trap one and two are used to recover the product of the reaction to increase its purity)
Closing all MFC bypass valves.
Closing all bypass valves of the cold traps
Closing the bypass of the absorber and open the absorber valves
Switching on the cooling water for the RPS (Remote Plasma Source) and the MPS (Microwave Power Supply), checking that it exceeds 4 l/min

The invention claimed is:

1. A process for separating a metal fluoride comprising uranium and a metal fluoride comprising molybdenum, comprising
  a step of providing a mixture containing MoF$_6$ and UF$_6$ as an initial metal fluoride mixture;
  a dissolution step, which comprises dissolving MoF$_6$ and UF$_6$ in a liquid phase or a supercritical fluid phase to obtain a solution containing both MoF$_6$ and UF$_6$ in dissolved form;

a precipitation step, which comprises reducing the $UF_6$ contained in the solution to $UF_5$ and allowing it to precipitate from the solution; and a separation step, which comprises
(i) separating the precipitated $UF_5$ from the solution; or
(ii) removing the liquid phase or supercritical fluid phase of the solution in the presence of the precipitated $UF_5$ to obtain a solid phase containing the precipitated $UF_5$ and molybdenum fluoride, and separating the $UF_5$ and the molybdenum fluoride or a conversion product thereof which may be obtained by further converting the molybdenum fluoride to another molybdenum compound.

2. The process according to claim 1, wherein the mixture containing $MoF_6$ and $UF_6$ which is provided as an initial metal fluoride mixture is a gas phase mixture containing $MoF_6$ and $UF_6$ mixed in gaseous form.

3. The process according to claim 2, which further comprises a step wherein the gas phase mixture containing $MoF_6$ and $UF_6$ is cooled to a temperature where $MoF_6$ and $UF_6$ contained in the gas phase are deposited as a mixture containing $MoF_6$ and $UF_6$, the mixture is recovered, and
is subsequently subjected, optionally after re-evaporation to provide a gas-phase mixture containing $MoF_6$ and $UF_6$ in gaseous form, to the dissolution step.

4. The process according to claim 2, which further comprises, prior to the dissolution step, a step wherein the gas phase mixture containing $MoF_6$ and $UF_6$ is cooled to a temperature where a portion of the $UF_6$ contained in the gas phase is deposited and removed from the gas phase.

5. The process according to claim 1, wherein $MoF_6$ and $UF_6$ are dissolved in the dissolution step in a liquid phase which comprises or consists of liquid $SO_2$ as a solvent or in a supercritical fluid phase which comprises or consists of CO in a supercritical state.

6. The process according to claim 1, wherein the separation step comprises separating the precipitated $UF_5$ from the solution.

7. The process according to claim 6, wherein the separation step further comprises converting $MoF_6$ contained in the solution to another molybdenum compound prior to or after the separation of the precipitated $UF_5$ from the solution, and
recovering the molybdenum compound from the solution after the separation of the precipitated $UF_5$ from the solution.

8. The process according to claim 6, wherein the separation step comprises reducing the $MoF_6$ contained in the solution to obtain a solution containing $MoF_5$ prior to or after the separation of the precipitated $UF_5$ from the solution.

9. The process according to claim 1, wherein the separation step comprises (ii) removing the liquid phase or supercritical fluid phase of the solution in the presence of the precipitated $UF_5$ to obtain a solid phase containing the precipitated $UF_5$ and molybdenum fluoride, and separating the $UF_5$ and the molybdenum fluoride.

10. The process according to claim 9, wherein the separation step comprises reducing the $MoF_6$ contained in the solution to obtain a solution containing $MoF_5$ prior to removing the liquid phase or supercritical fluid phase of the solution, and wherein the solid phase obtained by removing the liquid phase or supercritical fluid phase of the solution contains the precipitated $UF_5$ and $MoF_5$.

11. The process according to claim 10, wherein the precipitated $UF_5$ and $MoF_5$ are separated via sublimation of the $MoF_5$ and its deposition separate from the $UF_5$.

12. The process according to claim 1, wherein the step of providing a mixture containing $MoF_6$ and $UF_6$ as an initial metal fluoride mixture comprises reacting a solid material, which contains elemental uranium and elemental molybdenum, with fluorine radicals, and wherein the reaction comprises exposing the solid material to a gas flow comprising the fluorine radicals, to obtain the mixture containing $MoF_6$ and $UF_6$.

13. The process according to claim 12, wherein the step of providing a mixture containing $MoF_6$ and $UF_6$ as an initial metal fluoride mixture comprises generating the fluorine radicals from a fluorine containing precursor compound in a plasma source, more preferably in a remote plasma source.

14. A process for separating a metal fluoride comprising uranium and a metal fluoride comprising molybdenum, comprising
a step of providing a gas phase mixture containing $MoF_6$, $UF_6$ and a fluorine atom scavenger mixed in gaseous form;
a step of irradiating the $UF_6$ in the gas phase mixture in the presence of the fluorine atom scavenger with light having a wavelength in the range of 340 to 410 nm to reduce the $UF_6$ to $UF_5$ and to obtain a mixture comprising $UF_5$ and $MoF_6$; and
a step of separating the $UF_5$ and the $MoF_6$.

15. The process according to claim 14, wherein the light used for irradiation has a wavelength of 380 to 400 nm.

16. The process according to claim 14, wherein the fluorine atom scavenger in gaseous form is selected from CO, $H_2$, Xe and $SO_2$.

17. The process according to claim 14, which further comprises a step of removing a reaction product of the fluorine atom scavenger and the fluorine formed by the reduction of $UF_6$ to $UF_5$.

18. The process according to claim 14, wherein the $UF_5$ and the $MoF_6$ are separated by distilling off the $MoF_6$.

19. The process according to claim 15, wherein the light used for irradiation has a wavelength of 395 nm.

* * * * *